(12) United States Patent
Allen et al.

(10) Patent No.: US 12,458,539 B2
(45) Date of Patent: Nov. 4, 2025

(54) DRAPES WITH REGIONS WITH HIGHER ADHESIVE PROPERTIES

(71) Applicant: KCI Manufacturing Unlimited Company, Athlone County (IE)

(72) Inventors: Diwi L. Allen, San Antonio, TX (US); Prathamesh Madhav Kharkar, San Antonio, TX (US); Marisa Schmidt, San Antonio, TX (US)

(73) Assignee: KCI Manufacturing Unlimited Company, Westmeath (IE)

( * ) Notice: Subject to any disclaimer, the term of this patent is extended or adjusted under 35 U.S.C. 154(b) by 637 days.

(21) Appl. No.: 17/772,956

(22) PCT Filed: Nov. 6, 2020

(86) PCT No.: PCT/IB2020/060490
§ 371 (c)(1),
(2) Date: Apr. 28, 2022

(87) PCT Pub. No.: WO2021/090277
PCT Pub. Date: May 14, 2021

(65) Prior Publication Data
US 2024/0156643 A1    May 16, 2024

Related U.S. Application Data

(60) Provisional application No. 62/932,930, filed on Nov. 8, 2019.

(51) Int. Cl.
*A61F 13/00* (2024.01)
*A61F 13/0246* (2024.01)
*A61F 13/05* (2024.01)

(52) U.S. Cl.
CPC ........ *A61F 13/025* (2013.01); *A61F 13/0253* (2013.01); *A61F 13/05* (2024.01)

(58) Field of Classification Search
USPC .......................................... 602/55
See application file for complete search history.

(56) References Cited

U.S. PATENT DOCUMENTS

| 1,355,846 A | 10/1920 | Rannells |
| 2,547,758 A | 4/1951 | Keeling |

(Continued)

FOREIGN PATENT DOCUMENTS

| AU | 550575 B2 | 3/1986 |
| AU | 745271 B2 | 3/2002 |

(Continued)

OTHER PUBLICATIONS

WO 2014093246 A1 (Year: 2014).*

(Continued)

*Primary Examiner* — Kim M Lewis

(57) ABSTRACT

Provided are devices, systems, and methods related to dressings with regions with different adhesive properties, and manufacture and use thereof. An illustrative dressing includes a first region including a first adhesive material. The first adhesive material has a first tackiness. The dressing further includes at least a second region including a second adhesive material. The second adhesive material has a second tackiness in a first phase and a third tackiness in a second phase. The third tackiness is greater than the second tackiness. The first adhesive material is configured to maintain the first tackiness when the second adhesive material is in the second phase.

29 Claims, 8 Drawing Sheets

(56) References Cited

U.S. PATENT DOCUMENTS

| | | | |
|---|---|---|---|
| 2,632,443 A | 3/1953 | Lesher | |
| 2,682,873 A | 7/1954 | Evans et al. | |
| 2,910,763 A | 11/1959 | Lauterbach | |
| 2,969,057 A | 1/1961 | Simmons | |
| 3,066,672 A | 12/1962 | Crosby, Jr. et al. | |
| 3,367,332 A | 2/1968 | Groves | |
| 3,520,300 A | 7/1970 | Flower, Jr. | |
| 3,568,675 A | 3/1971 | Harvey | |
| 3,648,692 A | 3/1972 | Wheeler | |
| 3,682,180 A | 8/1972 | McFarlane | |
| 3,826,254 A | 7/1974 | Mellor | |
| 4,080,970 A | 3/1978 | Miller | |
| 4,096,853 A | 6/1978 | Weigand | |
| 4,139,004 A | 2/1979 | Gonzalez, Jr. | |
| 4,165,748 A | 8/1979 | Johnson | |
| 4,184,510 A | 1/1980 | Murry et al. | |
| 4,233,969 A | 11/1980 | Lock et al. | |
| 4,245,630 A | 1/1981 | Lloyd et al. | |
| 4,256,109 A | 3/1981 | Nichols | |
| 4,261,363 A | 4/1981 | Russo | |
| 4,275,721 A | 6/1981 | Olson | |
| 4,284,079 A | 8/1981 | Adair | |
| 4,297,995 A | 11/1981 | Golub | |
| 4,333,468 A | 6/1982 | Geist | |
| 4,373,519 A | 2/1983 | Errede et al. | |
| 4,382,441 A | 5/1983 | Svedman | |
| 4,392,853 A | 7/1983 | Muto | |
| 4,392,858 A | 7/1983 | George et al. | |
| 4,419,097 A | 12/1983 | Rowland | |
| 4,465,485 A | 8/1984 | Kashmer et al. | |
| 4,475,909 A | 10/1984 | Eisenberg | |
| 4,480,638 A | 11/1984 | Schmid | |
| 4,525,166 A | 6/1985 | Leclerc | |
| 4,525,374 A | 6/1985 | Vaillancourt | |
| 4,540,412 A | 9/1985 | Van Overloop | |
| 4,543,100 A | 9/1985 | Brodsky | |
| 4,548,202 A | 10/1985 | Duncan | |
| 4,551,139 A | 11/1985 | Plaas et al. | |
| 4,569,348 A | 2/1986 | Hasslinger | |
| 4,605,399 A | 8/1986 | Weston et al. | |
| 4,608,041 A | 8/1986 | Nielsen | |
| 4,640,688 A | 2/1987 | Hauser | |
| 4,655,754 A | 4/1987 | Richmond et al. | |
| 4,664,662 A | 5/1987 | Webster | |
| 4,710,165 A | 12/1987 | McNeil et al. | |
| 4,733,659 A | 3/1988 | Edenbaum et al. | |
| 4,743,232 A | 5/1988 | Kruger | |
| 4,758,220 A | 7/1988 | Sundblom et al. | |
| 4,787,888 A | 11/1988 | Fox | |
| 4,826,494 A | 5/1989 | Richmond et al. | |
| 4,838,883 A | 6/1989 | Matsuura | |
| 4,840,187 A | 6/1989 | Brazier | |
| 4,863,449 A | 9/1989 | Therriault et al. | |
| 4,872,450 A | 10/1989 | Austad | |
| 4,878,901 A | 11/1989 | Sachse | |
| 4,897,081 A | 1/1990 | Poirier et al. | |
| 4,906,233 A | 3/1990 | Moriuchi et al. | |
| 4,906,240 A | 3/1990 | Reed et al. | |
| 4,919,654 A | 4/1990 | Kalt | |
| 4,941,882 A | 7/1990 | Ward et al. | |
| 4,953,565 A | 9/1990 | Tachibana et al. | |
| 4,969,880 A | 11/1990 | Zamierowski | |
| 4,985,019 A | 1/1991 | Michelson | |
| 5,037,397 A | 8/1991 | Kalt et al. | |
| 5,086,170 A | 2/1992 | Luheshi et al. | |
| 5,092,858 A | 3/1992 | Benson et al. | |
| 5,100,396 A | 3/1992 | Zamierowski | |
| 5,134,994 A | 8/1992 | Say | |
| 5,149,331 A | 9/1992 | Ferdman et al. | |
| 5,167,613 A | 12/1992 | Karami et al. | |
| 5,176,663 A | 1/1993 | Svedman et al. | |
| 5,215,522 A | 6/1993 | Page et al. | |
| 5,232,453 A | 8/1993 | Plass et al. | |
| 5,261,893 A | 11/1993 | Zamierowski | |
| 5,278,100 A | 1/1994 | Doan et al. | |
| 5,279,550 A | 1/1994 | Habib et al. | |
| 5,298,015 A | 3/1994 | Komatsuzaki et al. | |
| 5,342,376 A | 8/1994 | Ruff | |
| 5,344,415 A | 9/1994 | DeBusk et al. | |
| 5,358,494 A | 10/1994 | Svedman | |
| 5,437,622 A | 8/1995 | Carion | |
| 5,437,651 A | 8/1995 | Todd et al. | |
| 5,527,293 A | 6/1996 | Zamierowski | |
| 5,549,584 A | 8/1996 | Gross | |
| 5,556,375 A | 9/1996 | Ewall | |
| 5,607,388 A | 3/1997 | Ewall | |
| 5,636,643 A | 6/1997 | Argenta et al. | |
| 5,645,081 A | 7/1997 | Argenta et al. | |
| 6,071,267 A | 6/2000 | Zamierowski | |
| 6,135,116 A | 10/2000 | Vogel et al. | |
| 6,184,264 B1* | 2/2001 | Webster | A61F 13/0203 522/182 |
| 6,241,747 B1 | 6/2001 | Ruff | |
| 6,287,316 B1 | 9/2001 | Agarwal et al. | |
| 6,345,623 B1 | 2/2002 | Heaton et al. | |
| 6,488,643 B1 | 12/2002 | Tumey et al. | |
| 6,493,568 B1 | 12/2002 | Bell et al. | |
| 6,553,998 B2 | 4/2003 | Heaton et al. | |
| 6,814,079 B2 | 11/2004 | Heaton et al. | |
| 7,846,141 B2 | 12/2010 | Weston | |
| 8,062,273 B2 | 11/2011 | Weston | |
| 8,216,198 B2 | 7/2012 | Heagle et al. | |
| 8,251,979 B2 | 8/2012 | Malhi | |
| 8,257,327 B2 | 9/2012 | Blott et al. | |
| 8,398,614 B2 | 3/2013 | Blott et al. | |
| 8,449,509 B2 | 5/2013 | Weston | |
| 8,529,548 B2 | 9/2013 | Blott et al. | |
| 8,535,296 B2 | 9/2013 | Blott et al. | |
| 8,551,060 B2 | 10/2013 | Schuessler et al. | |
| 8,568,386 B2 | 10/2013 | Malhi | |
| 8,679,081 B2 | 3/2014 | Heagle et al. | |
| 8,834,451 B2 | 9/2014 | Blott et al. | |
| 8,926,592 B2 | 1/2015 | Blott et al. | |
| 9,017,302 B2 | 4/2015 | Vitaris et al. | |
| 9,198,801 B2 | 12/2015 | Weston | |
| 9,211,365 B2 | 12/2015 | Weston | |
| 9,289,542 B2 | 3/2016 | Blott et al. | |
| 2002/0077661 A1 | 6/2002 | Saadat | |
| 2002/0115951 A1 | 8/2002 | Norstrem et al. | |
| 2002/0120185 A1 | 8/2002 | Johnson | |
| 2002/0143286 A1 | 10/2002 | Tumey | |
| 2009/0216170 A1* | 8/2009 | Robinson | A61F 13/0246 602/60 |
| 2012/0330253 A1 | 12/2012 | Robinson et al. | |
| 2014/0012213 A1* | 1/2014 | Locke | A61F 13/05 156/252 |
| 2014/0155791 A1* | 6/2014 | Robinson | A61H 9/0057 601/7 |
| 2014/0163491 A1 | 6/2014 | Schuessler et al. | |
| 2015/0080788 A1 | 3/2015 | Blott et al. | |
| 2018/0116859 A1* | 5/2018 | Strøbech | A61F 5/445 |
| 2020/0338228 A1* | 10/2020 | Kharkar | C09J 7/38 |

FOREIGN PATENT DOCUMENTS

| | | |
|---|---|---|
| AU | 755496 B2 | 12/2002 |
| CA | 2005436 A1 | 6/1990 |
| DE | 26 40 413 A1 | 3/1978 |
| DE | 43 06 478 A1 | 9/1994 |
| DE | 29 504 378 U1 | 9/1995 |
| EP | 0100148 A1 | 2/1984 |
| EP | 0117632 A2 | 9/1984 |
| EP | 0161865 A2 | 11/1985 |
| EP | 0358302 A2 | 3/1990 |
| EP | 1018967 A1 | 7/2000 |
| GB | 692578 A | 6/1953 |
| GB | 2195255 A | 4/1988 |
| GB | 2 197 789 A | 6/1988 |
| GB | 2 220 357 A | 1/1990 |
| GB | 2 235 877 A | 3/1991 |
| GB | 2 329 127 A | 3/1999 |
| GB | 2 333 965 A | 8/1999 |
| JP | 4129536 B2 | 8/2008 |

(56) References Cited

FOREIGN PATENT DOCUMENTS

| SG | 71559 | 4/2002 | | |
|---|---|---|---|---|
| WO | 80/02182 A1 | 10/1980 | | |
| WO | 87/04626 A1 | 8/1987 | | |
| WO | 90/010424 A1 | 9/1990 | | |
| WO | 93/009727 A1 | 5/1993 | | |
| WO | 94/20041 A1 | 9/1994 | | |
| WO | 96/05873 A1 | 2/1996 | | |
| WO | 97/18007 A1 | 5/1997 | | |
| WO | 99/13793 A1 | 3/1999 | | |
| WO | 2012048128 A2 | 4/2012 | | |
| WO | WO-2014093246 A1 * | 6/2014 | ........... | A61F 13/025 |
| WO | WO-2015122220 A1 * | 8/2015 | ............ | B32B 37/10 |
| WO | WO-2019161321 A1 * | 8/2019 | ............ | A61B 46/20 |
| WO | 2020055934 A1 | 3/2020 | | |

OTHER PUBLICATIONS

WO 2015122220 A1 translation (Year: 2015).*

WO 2019161321 (Year: 2019).*

International Search Report and Written Opinion for Corresponding Application No. PCT/IB2020/060490, mailed Feb. 11, 2021.

Louis C. Argenta, MD and Michael J. Morykwas, PHD; Vacuum-Assisted Closure: A New Method for Wound Control and Treatment: Clinical Experience; Annals of Plastic Surgery; vol. 38, No. 6, Jun. 1997; pp. 563-576.

Susan Mendez-Eatmen, RN; "When wounds Won't Heal" RN Jan. 1998, vol. 61 (1); Medical Economics Company, Inc., Montvale, NJ, USA; pp. 20-24.

James H. Blackburn II, MD et al.: Negative-Pressure Dressings as a Bolster for Skin Grafts; Annals of Plastic Surgery, vol. 40, No. 5, May 1998, pp. 453-457; Lippincott Williams & Wilkins, Inc., Philidelphia, PA, USA.

John Masters; "Reliable, Inexpensive and Simple Suction Dressings"; Letter to the Editor, British Journal of Plastic Surgery, 1998, vol. 51 (3), p. 267; Elsevier Science/The British Association of Plastic Surgeons, UK.

S.E. Greer, et al. "The Use of Subatmospheric Pressure Dressing Therapy to Close Lymphocutaneous Fistulas of the Groin" British Journal of Plastic Surgery (2000), 53, pp. 484-487.

George V. Letsou, MD., et al; "Stimulation of Adenylate Cyclase Activity in Cultured Endothelial Cells Subjected to Cyclic Stretch"; Journal of Cardiovascular Surgery, 31, 1990, pp. 634-639.

Orringer, Jay, et al; "Management of Wounds in Patients with Complex Enterocutaneous Fistulas"; Surgery, Gynecology & Obstetrics, Jul. 1987, vol. 165, pp. 79-80.

International Search Report for PCT International Application PCT/GB95/01983; Nov. 23, 1995.

PCT International Search Report for PCT International Application PCT/GB98/02713; Jan. 8, 1999.

PCT Written Opinion; PCT International Application PCT/GB98/02713; Jun. 8, 1999.

PCT International Examination and Search Report, PCT International Application PCT/GB96/02802; Jan. 15, 1998 & Apr. 29, 1997.

PCT Written Opinion, PCT International Application PCT/GB96/02802; Sep. 3, 1997.

Dattilo, Philip P., Jr., et al; "Medical Textiles: Application of an Absorbable Barbed Bi-directional Surgical Suture"; Journal of Textile and Apparel, Technology and Management, vol. 2, Issue 2, Spring 2002, pp. 1-5.

Kostyuchenok, B.M., et al; "Vacuum Treatment in the Surgical Management of Purulent Wounds"; Vestnik Khirurgi, Sep. 1986, pp. 18-21 and 6 page English translation thereof.

Davydov, Yu. A., et al; "Vacuum Therapy in the Treatment of Purulent Lactation Mastitis"; Vestnik Khirurgi, May 14, 1986, pp. 66-70, and 9 page English translation thereof.

Yusupov. Yu.N., et al; "Active Wound Drainage", Vestnki Khirurgi, vol. 138, Issue 4, 1987, and 7 page English translation thereof.

Davydov, Yu.A., et al; "Bacteriological and Cytological Assessment of Vacuum Therapy for Purulent Wounds"; Vestnik Khirugi, Oct. 1988, pp. 48-52, and 8 page English translation thereof.

Davydov, Yu.A., et al; "Concepts for the Clinical-Biological Management of the Wound Process in the Treatment of Purulent Wounds by Means of Vacuum Therapy"; Vestnik Khirurgi, Jul. 7, 1980, pp. 132-136, and 8 page English translation thereof.

Chariker, Mark E., M.D., et al; "Effective Management of incisional and cutaneous fistulae with closed suction wound drainage"; Contemporary Surgery, vol. 34, Jun. 1989, pp. 59-63.

Egnell Minor, Instruction Book, First Edition, 300 7502, Feb. 1975, pp. 24.

Egnell Minor: Addition to the Users Manual Concerning Overflow Protection—Concerns all Egnell Pumps, Feb. 3, 1983, pp. 2.

Svedman, P.: "Irrigation Treatment of Leg Ulcers", The Lancet, Sep. 3, 1983, pp. 532-534.

Chinn, Steven D. et al.: "Closed Wound Suction Drainage", The Journal of Foot Surgery, vol. 24, No. 1, 1985, pp. 76-81.

Arnljots, Björn et al.: "Irrigation Treatment in Split-Thickness Skin Grafting of Intractable Leg Ulcers", Scand J. Plast Reconstr. Surg., No. 19, 1985, pp. 211-213.

Svedman, P.: "A Dressing Allowing Continuous Treatment of a Biosurface", IRCS Medical Science: Biomedical Technology, Clinical Medicine, Surgery and Transplantation, vol. 7, 1979, p. 221.

Svedman, P. et al: "A Dressing System Providing Fluid Supply and Suction Drainage Used for Continuous of Intermittent Irrigation", Annals of Plastic Surgery, vol. 17, No. 2, Aug. 1986, pp. 125-133.

N.A. Bagautdinov, "Variant of External Vacuum Aspiration in the Treatment of Purulent Diseases of Soft Tissues," Current Problems in Modern Clinical Surgery: Interdepartmental Collection, edited by V. Ye Volkov et al. (Chuvashia State University, Cheboksary, U.S.S.R. 1986); pp. 94-96 (copy and certified translation).

K.F. Jeter, T.E. Tintle, and M. Chariker, "Managing Draining Wounds and Fistulae: New and Established Methods," Chronic Wound Care, edited by D. Krasner (Health Management Publications, Inc., King of Prussia, PA 1990), pp. 240-246.

G. Živadinovi?, V. ?uki?, Ž. Maksimovi?, ?. Radak, and P. Peška, "Vacuum Therapy in the Treatment of Peripheral Blood Vessels," Timok Medical Journal 11 (1986), pp. 161-164 (copy and certified translation).

F.E. Johnson, "An Improved Technique for Skin Graft Placement Using a Suction Drain," Surgery, Gynecology, and Obstetrics 159 (1984), pp. 584-585.

A.A. Safronov, Dissertation Abstract, Vacuum Therapy of Trophic Ulcers of the Lower Leg with Simultaneous Autoplasty of the Skin (Central Scientific Research Institute of Traumatology and Orthopedics, Moscow, U.S.S.R. 1967) (copy and certified translation).

M. Schein, R. Saadia, J.R. Jamieson, and G.A.G. Decker, "The 'Sandwich Technique' in the Management of the Open Abdomen," British Journal of Surgery 73 (1986), pp. 369-370.

D.E. Tribble, An Improved Sump Drain-Irrigation Device of Simple Construction, Archives of Surgery 105 (1972) pp. 511-513.

M.J. Morykwas, L.C. Argenta, E.I. Shelton-Brown, and W. McGuirt, "Vacuum-Assisted Closure: A New Method for Wound Control and Treatment: Animal Studies and Basic Foundation," Annals of Plastic Surgery 38 (1997), pp. 553-562 (Morykwas I).

C.E. Tennants, "The Use of Hypermia in the Postoperative Treatment of Lesions of the Extremities and Thorax," Journal of the American Medical Association 64 (1915), pp. 1548-1549.

Selections from W. Meyer and V. Schmieden, Bier's Hyperemic Treatment in Surgery, Medicine, and the Specialties: A Manual of Its Practical Application, (W.B. Saunders Co., Philadelphia, PA 1909), pp. 17-25, 44-64, 90-96, 167-170, and 210-211.

V.A. Solovev et al., Guidelines, The Method of Treatment of Immature External Fistulas in the Upper Gastrointestinal Tract, editor-in-chief Prov. V.I. Parahonyak (S.M. Kirov Gorky State Medical Institute, Gorky, U.S.S.R. 1987) ("Solovev Guidelines").

V.A. Kuznetsov & N.a. Bagautdinov, "Vacuum and Vacuum-Sorption Treatment of Open Septic Wounds," in II All-Union Conference on Wounds and Wound Infections: Presentation Abstracts, edited by B.M. Kostyuchenok et al. (Moscow, U.S.S.R. Oct. 28-29, 1986) pp. 91-92 ("Bagautdinov II").

(56) References Cited

OTHER PUBLICATIONS

V.A. Solovev, Dissertation Abstract, Treatment and Prevention of Suture Failures after Gastric Resection (S.M. Kirov Gorky State Medical Institute, Gorky, U.S.S.R. 1988) ("Solovev Abstract").
V.A.C.® Therapy Clinical Guidelines: A Reference Source for Clinicians; Jul. 2007.

* cited by examiner

DRAPES WITH REGIONS WITH HIGHER ADHESIVE PROPERTIES

CROSS-REFERENCE TO RELATED APPLICATIONS

This application claims the benefit of priority to U.S. Provisional Application No. 62/932,930, filed on Nov. 8, 2019, which is incorporated herein by reference in its entirety.

TECHNICAL FIELD

Aspects of the present disclosure relate generally to drapes, such as a drape for use with medical devices, and more specifically, but not by way of limitation, to an apparatus including the drape.

BACKGROUND

Some therapy devices that provide therapeutic pressure to a wound site utilize a drape to create a pressurized treatment or therapy area. The drape may be attached to the wound site via adhesive and to the therapy device using tubing. For example, a drape may be attached to a wound site using silicone gel adhesive. However, silicone adhesives typically have a lower tackiness (e.g., stickiness), and often do not offer sufficient bond/peel strength and wearability time as compared to conventional acrylic adhesives. Acrylic adhesives have a higher tackiness than silicone adhesives and may provide sufficient bond/peel strength and wearability time. However, when it comes time to remove a drape attached with conventional acrylic adhesives, the higher tackiness of the conventional acrylic adhesive may cause trauma to the skin of a wearer when the drape is removed. Additionally, a drape attached with only acrylic adhesive is not repositionable, which can cause problems because drapes have a tendency to bunch up, making it difficult for the wearer to correctly apply the drape the first time. In order to attach some types drapes or dressings, such as island dressings, such that they stay in place for the desired amount of time, additional strips of dressing (including the conventional acrylic adhesive) may be cut and attached to the edges of the island drape (or dressing) to more firmly secure the island drape to the skin. However, this requires additional materials (e.g., strips of dressing) and it is more complicated and labor intensive to attach island dressings in this manner.

SUMMARY

This disclosure describes drapes, devices including drapes, and systems and methods related to forming and/or using drapes. The drapes described herein have regions with adhesive materials with different tackiness (e.g., stickiness). The adhesives may additionally have different peel strengths. To illustrate, a drape described herein includes a first region that includes a first adhesive material and at least a second region that includes a second adhesive material. The first adhesive material has a first tackiness, and the second adhesive material has a second tackiness in a first phase and a third tackiness in a second phase. The third tackiness is greater than the second tackiness. In some implementations, the first tackiness and the second tackiness are the same. Accordingly, the drape may be repositionable when the second adhesive material is in the first phase (e.g., because the second tackiness is low enough such that the drape may be removed and repositioned), and the drape may provide sufficient bond/peel strength to prevent leaks when the second adhesive material is in the second phase (e.g., due to the higher third tackiness). Additionally, a peel strength of the second adhesive material in the first phase may be low enough such that a combination of the tack and the peel strength is low enough such that the drape may be removed and repositioned without trauma. A peel strength of the second adhesive material in the second phase provides sufficient adhesion/bond strength to prevent leaks when the second adhesive material is in the second phase. Furthermore, because only a portion (e.g., the second region) of the drape has the higher tackiness (and optionally higher peel strength), the drape may be removed without causing trauma to the skin of a wearer, as compared to a drape that entirely has the third tackiness. Thus drapes, such as island drapes or island dressings, may be repositionable at some times and prevent or mitigate leaks at others, without requiring additional adhesive strips to attach the island drapes.

The second adhesive material may be transitioned from the first phase to the second phase by receipt of an energy input. As a non-limiting example, the energy input may include mechanical force, e.g., pressure. To illustrate, the first adhesive material may include a silicone gel adhesive, and the second adhesive material may include a silicone gel adhesive that contains encapsulated acrylic adhesive. Applying force/pressure to the second region may break the encapsulation of the acrylic adhesive, causing the acrylic adhesive to bond with the tissue site and increase the tackiness from the second tackiness to the third tackiness. In other examples, the encapsulation of the acrylic adhesive may be broken down by application of infrared light, ultraviolet light, ultrasound, or heat to the second region. In other examples, other types of adhesive, such as rosins, tackifiers, etc., may be used instead of acrylic adhesive. In still other implementations, the second adhesive material may be a light switchable adhesive that transitions from the first phase to the second phase in response to receipt of light, such as visible light or ultraviolet light, to the second region. For example, the light switchable adhesive may be inactive or partially cured in the first phase such that the tackiness is low (and the drape is repositionable), and the light switchable adhesive may be "activated" or cured to increase curing in the second phase (e.g., by application of light to the second region) such that the tackiness increases, to secure the drape to the skin and to prevent leaks.

Thus, the drapes of the present disclosure may be repositionable, as compared to conventional drapes. Additionally, the drapes of the present disclosure, due to the two phases of the second adhesive material, may have sufficient tackiness and peel strength to improve wear time and prevent leaks while still being removable without causing (or reducing) trauma, such as maceration and tissue damage, at a tissue site when removed. Reducing (or eliminating) trauma may improve patient comfort with the drape.

Some embodiments of the present drapes comprise: a first region including a first adhesive material. The first adhesive material has a first tackiness. The drapes further comprise at least a second region including a second adhesive material. The second adhesive material has a second tackiness in a first phase and a third tackiness in a second phase. The third tackiness is greater than the second tackiness. The first adhesive material is configured to maintain the first tackiness when the second adhesive material is in the second phase.

In some of the foregoing embodiments of the present drapes, the first tackiness is the same as the second tackiness.

Additionally, or alternatively, the second adhesive material includes at least one component that is not included in the first adhesive material.

In some of the foregoing embodiments of the present drapes, the first adhesive material comprises a silicone gel adhesive, and the second adhesive material comprises a releasable acrylic adhesive. In some such embodiments, the releasable acrylic adhesive is encapsulated in one or more shells when the second adhesive material is in the first phase, and the releasable acrylic adhesive is released when the second adhesive material is in the second phase. Alternatively, the first adhesive material comprises silicone gel adhesive, and the second adhesive material comprises releasable rosin. Alternatively, the first adhesive material comprises silicone gel adhesive, and the second adhesive material comprises a releasable tackifier chemical compound. Alternatively, the first adhesive material comprises silicone gel adhesive, and wherein the second region comprises releasable L-3, 4-dihydroxyphenylalanine, releasable L-3, 4-dihydroxyphenylalanine quinone, releasable dehydrodihdyroxyphenylalanine, or releasable phosphorylated serine. Alternatively, the second adhesive material comprises a light switchable adhesive having the second tackiness in the first phase and the third tackiness in the second phase, and the light switchable adhesive is configured to transition from the first phase to the second phase based on receiving light.

In some of the foregoing embodiments of the present drapes, the second region is configured to receive an energy input to transition the second adhesive material from the first phase to the second phase. In some such embodiments, the energy input comprises visible light, and the second adhesive material is configured to transition from the first phase to the second phase based on receiving the visible light for more than a threshold time period. Alternatively, the energy input comprises infrared light, and the second adhesive material is configured to transition from the first phase to the second phase based on receiving the infrared light for more than a threshold time period. Alternatively, the energy input comprises ultraviolet light, and the second adhesive material is configured to transition from the first phase to the second phase based on receiving the ultraviolet light for more than a threshold time period. Alternatively, the energy input comprises pressure, and the second adhesive material is configured to transition from the first phase to the second phase based on receiving more than a threshold amount of the pressure. Alternatively, the energy input comprises ultrasound, and the second adhesive material is configured to transition from the first phase to the second phase based on receiving the ultrasound for more than a threshold time period. Alternatively, the energy input comprises heat, and the second adhesive material is configured to transition from the first phase to the second phase based on receiving more than a threshold amount of the heat.

In some of the foregoing embodiments of the present drapes, the second region has a linear shape. Alternatively, the second region has a circular shape. Alternatively, the second region has an elliptical shape. Alternatively, the second region forms part of a grid pattern, the grid pattern enabling a selectable area corresponding to the third tackiness. Additionally, or alternatively, the second region is disposed substantially within a center of the drape. Alternatively, the second region is disposed along an edge of the drape.

In some of the foregoing embodiments of the present drapes, the second adhesive material is configured to release one or more colorimetric indicators that indicate a position of the second region when the second adhesive material is in the second phase. Additionally, or alternatively, the first region and the second region are repositionable when the second adhesive material is in the first phase. Additionally, or alternatively, the second region is not repositionable when the second adhesive material is in the second phase. Additionally, or alternatively, the drapes further comprise a removable protective film disposed on the second region.

Some embodiments of the present systems comprise the drape of the foregoing embodiments. The drape is configured to be attached to a tissue site. The systems comprise a wound therapy device configured to apply pressure to the tissue site. The systems further comprise a connector configured to couple the wound therapy device to the drape.

In some of the foregoing embodiments of the present systems, the systems further comprise a light source configured to emit light to the second region of the drape to transition the second adhesive material from the first phase to the second phase. In some such embodiments, the light comprises visible light, infrared light, or ultraviolet light. Alternatively, the systems further comprise an ultrasound emitter configured to emit ultrasound to the second region of the drape to transition the second adhesive material from the first phase to the second phase. Alternatively, the systems further comprise a heat source configured to emit heat to the second region of the drape to transition the second adhesive material from the first phase to the second phase.

Some embodiments of the present methods comprise: attaching a drape to a tissue site. The drape comprises a first region including a first adhesive material and a second region including a second adhesive material. The first adhesive material has a first tackiness and the second adhesive material has a second tackiness in a first phase and a third tackiness in a second phase. The third tackiness is greater than the second tackiness. The methods further comprise applying an energy input to the second region to transition the second adhesive material from the first phase to the second phase.

In some of the foregoing embodiments of the present methods, the energy input is selected from the group consisting of: visible light, infrared light, ultraviolet light, ultrasound, pressure, and heat. Additionally, or alternatively, the methods further comprise, prior to applying the energy input, repositioning the drape with respect to the tissue site. Additionally, or alternatively, the methods further comprise removing the drape from the tissue site. Additionally, or alternatively, the methods further comprise, prior to applying the energy input, removing a protective covering from the second region.

Some embodiments of the present methods comprise: covering a first region of a drape with a first adhesive having a first tackiness. The methods comprise disposing an encapsulated second adhesive to a second region of the drape. The encapsulated second adhesive has a second tackiness that is greater than the first tackiness. The methods further comprise covering the second region of the drape and the encapsulated second adhesive with the first adhesive.

In some of the foregoing embodiments of the present methods, the methods further comprise encapsulating the encapsulated second adhesive in one or more shells. Additionally, or alternatively, the first adhesive comprises silicone gel adhesive, and the encapsulated second adhesive comprises acrylic adhesive. Additionally, or alternatively, the methods further comprise attaching a protective covering to an opposite side of the second region.

Some embodiments of the present methods comprise: receiving, at a second region of a drape, an energy input. The drape comprises a first region including a first adhesive material and the second region including a second adhesive material. The first adhesive material has a first tackiness and the second adhesive material has a second tackiness in a first phase and a third tackiness in a second phase. The third tackiness is greater than the second tackiness. The methods further comprise, responsive to receiving the energy input, transitioning the second adhesive material from the first phase to the second phase.

In some of the foregoing embodiments of the present methods, transitioning the second adhesive material from the first phase to the second phase comprises breaking down one or more encapsulations containing an additional adhesive. Additionally, or alternatively, the methods further comprise changing a color of the second region when the second adhesive material is in the second phase.

Some embodiments of the present kits comprise: a drape comprising a first region including a first adhesive material. The first adhesive material has a first tackiness. The drape further comprises at least a second region including a second adhesive material. The second adhesive material has a second tackiness in a first phase and a third tackiness in a second phase. The third tackiness is greater than the second tackiness. The first adhesive material is configured to maintain the first tackiness when the second adhesive material is in the second phase. The kits further comprise a wound therapy device configured to be coupled to the drape.

In some of the foregoing embodiments of the present kits, the kits further comprise a connector configured to couple the drape to the wound therapy device. Additionally, or alternatively, the kits further comprise a package that includes the drape and the wound therapy device.

Some embodiments of the present drapes comprise: a first region including a first adhesive material. The first adhesive material has a first tackiness. The present drapes further comprises a second region including one or more shells of an encapsulated second adhesive material. The one or more shells are configured to release the second adhesive material responsive to receipt of an energy input at the second region. The second adhesive material has a second tackiness that is greater than the first tackiness.

In some of the foregoing embodiments, the energy input comprises one of visible light, ultraviolet light, infrared light, ultrasound, pressure, and heat. Additionally, or alternatively, the first adhesive material comprises a silicone gel adhesive, and the second adhesive material comprises an acrylic adhesive. Additionally, or alternatively, the first region and the second region are repositionable before the second adhesive material is released. Additionally, or alternatively, the second region is not repositionable when the second adhesive material is released.

As used herein, the term "switchable" will be used to refer to adhesives which can be changed at least from one phase (e.g., a high tack and/or peel strength phase, also referred to as a state) to another phase (e.g., a low tack and/or peel strength phase, such as a non-tacky phase). Recognizing that the expression "low tack and/or peel strength" is a relative term, it will be defined here as meaning a condition of a minimum reduction in tackiness which the adhesive reaches after switching from the high tack and/or peel strength phase. The reduction in tack or peel force may be as great as 99% or as little as 30%. Typically, the reduction in tack or peel force is between 70% and 90%.

As used herein, the term "peel strength" will be used to refer to a strength of adhesives measured by a 180 degree peel test on stainless steel. Recognizing that a bond strength of adhesive depends on the medium to which it adheres and that tissue composition can vary greatly, the measured peel strength is indicative of the adhesive's bond strength with tissue.

As used herein, the term "tackiness" will be used to refer to a strength of adhesives measured by a rolling ball test, as described in ASTM D3121-17 "Standard Test Method for Tack of Pressure-Sensitive Adhesives by Rolling Ball," which is incorporated herein by reference.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically. Additionally, two items that are "coupled" may be unitary with each other. To illustrate, components may be coupled by virtue of physical proximity, being integral to a single structure, or being formed from the same piece of material. Coupling may also include mechanical, thermal, electrical, communicational (e.g., wired or wireless), or chemical coupling (such as a chemical bond) in some contexts.

The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. As used herein, the term "approximately" may be substituted with "within 10 percent of" what is specified. Additionally, the term "substantially" may be substituted with "within [a percentage] of" what is specified, where the percentage includes 0.1, 1, or 5 percent; or may be understood to mean with a design, manufacture, or measurement tolerance. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Similarly, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any aspect of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. The feature or features of one embodiment may be applied to other embodiments, even though not described or illustrated, unless expressly prohibited by this disclosure or the nature of the embodiments.

Some details associated with the aspects of the present disclosure are described above, and others are described below. Other implementations, advantages, and features of the present disclosure will become apparent after review of the entire application, including the following sections: Brief Description of the Drawings, Detailed Description, and the Claims.

BRIEF DESCRIPTION OF THE DRAWINGS

A further understanding of the nature and advantages of the present disclosure may be realized by reference to the following drawings. The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION

Figure 1:
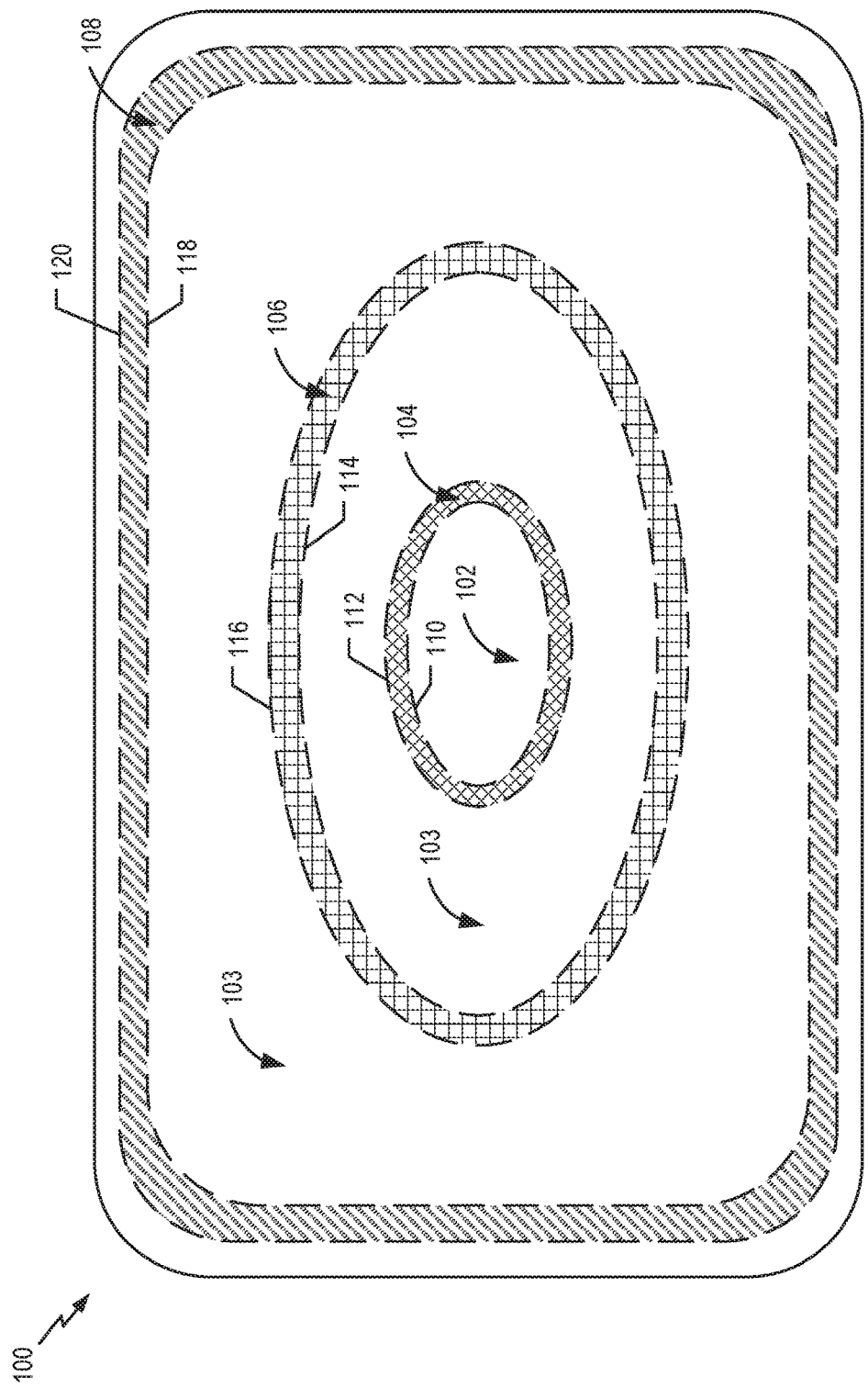
FIG. 1 is a diagram of an example of a drape having multiple regions with different tackiness.

As used herein, the terms "tissue site" and "target tissue" as used herein can broadly refer to a wound (e.g., open or closed), a tissue disorder, and/or the like located on or within tissue, such as, for example, bone tissue, adipose tissue, muscle tissue, neural tissue, dermal tissue, vascular tissue, connective tissue, cartilage, tendons, ligaments, and/or the like. The terms "tissue site" and "target tissue" as used herein can also refer to a surrounding tissue area(s) and/or areas of tissue that are not necessarily wounded or exhibit a disorder, but include tissue that would benefit from tissue generation and/or tissue that may be harvested and transplanted to another tissue location. The terms "tissue site" and "target tissue" may also include incisions, such as a surgical incision. In some implementations, "target tissue" may correspond or refer to a wound, and "tissue site" may correspond or refer to a tissue area(s) surrounding and including the target tissue. Additionally, the term "wound" as used herein can refer to a chronic, subacute, acute, traumatic, and/or dehisced incision, laceration, puncture, avulsion, and/or the like, a partial-thickness and/or full thickness burn, an ulcer (e.g., diabetic, pressure, venous, and/or the like), flap, and/or graft. A wound may include chronic, acute, traumatic, subacute, and dehisced wounds, partial-thickness burns, ulcers (such as diabetic, pressure, or venous insufficiency ulcers), flaps, grafts, and fistulas, for example.

The term "positive-pressure" (or "hyperbaric") as used herein generally refers to a pressure greater than a local ambient pressure, such as the ambient pressure in a local environment external to a sealed therapeutic environment (e.g., an internal volume). In most cases, this positive-pressure will be greater than the atmospheric pressure at which the patient is located. Alternatively, the positive-pressure may be greater than a hydrostatic pressure associated with tissue at the tissue site. Unless otherwise indicated, values of pressure stated herein are gauge pressures. References to increases in positive-pressure typically refer to an increase in absolute pressure, and decreases in positive-pressure typically refer to a decrease in absolute pressure. Additionally, the process of increasing pressure may be described illustratively herein as "applying", "delivering," "distributing," "generating", or "providing" positive-pressure, for example.

The term "reduced-pressure" (and "negative-pressure" or "hypobaric") as used herein generally refers to a pressure less than a local ambient pressure, such as the ambient pressure in a local environment external to a sealed therapeutic environment (e.g., an internal volume). In most cases, this reduced-pressure will be less than the atmospheric pressure at which the patient is located. Alternatively, the reduced-pressure may be less than a hydrostatic pressure associated with tissue at the tissue site. Unless otherwise indicated, values of pressure stated herein are gauge pressures. References to increases in reduced-pressure typically refer to a decrease in absolute pressure, and decreases in reduced-pressure typically refer to an increase in absolute pressure. Additionally, the process of reducing pressure may be described illustratively herein as "applying", "delivering," "distributing," "generating", or "providing" reduced-pressure, for example.

The term "fluid" may refer to liquid, gas, air, or a combination thereof. The term "fluid seal," or "seal," means a seal adequate to maintain a pressure differential (e.g., positive-pressure or reduced-pressure) at a desired site given the particular pressure source or subsystem involved. Similarly, it may be convenient to describe certain features in terms of fluid "inlet" or "outlet" in such a frame of reference. However, the fluid path may also be reversed in some applications, such as by substituting a reduced-pressure source (negative or hypobaric pressure source) for a positive-pressure source, and this descriptive convention should not be construed as a limiting convention.

Figure 5:
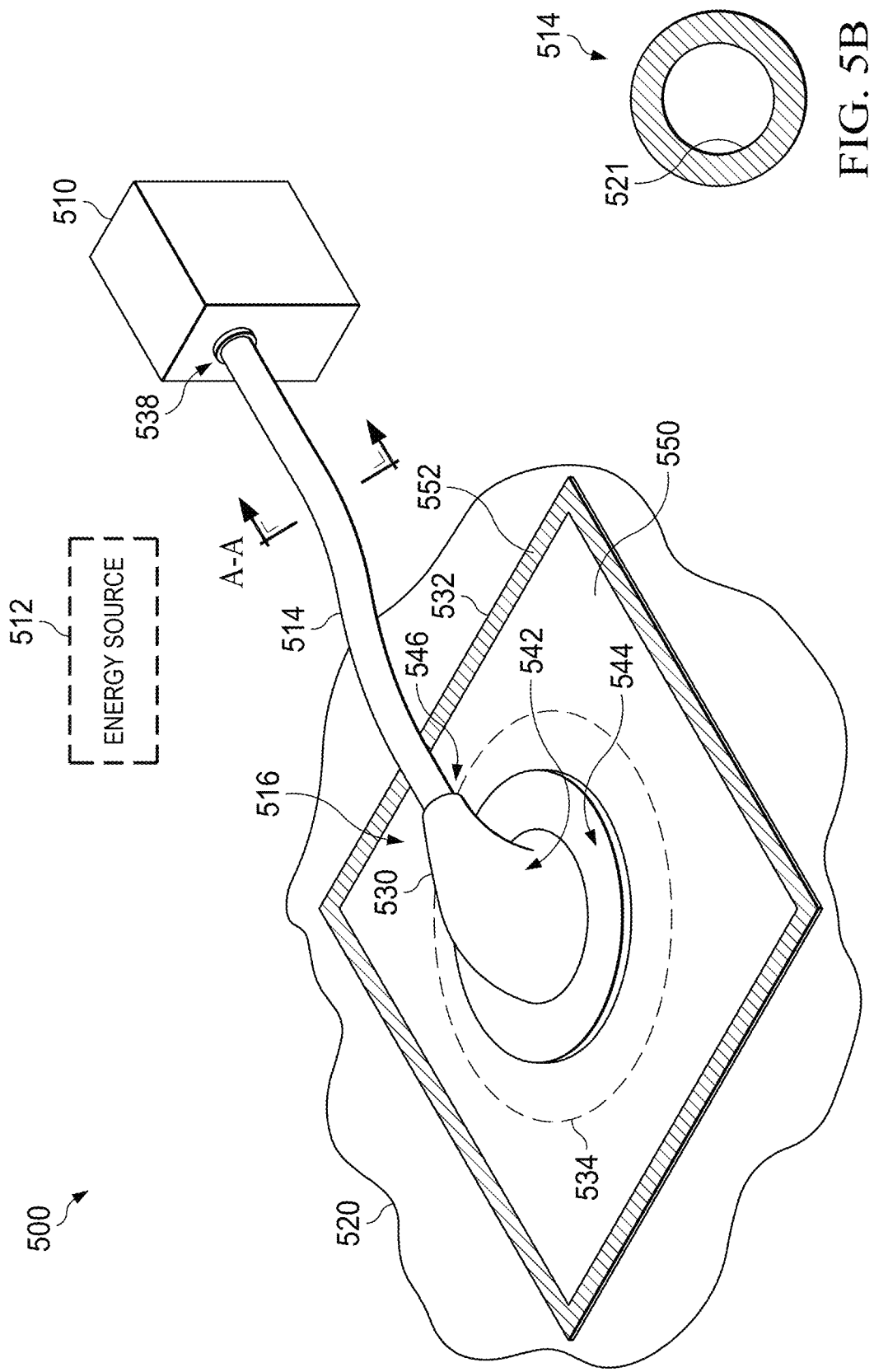
FIG. 5A is a diagram of an example of a therapy system for pressurized wound therapy.
FIG. 5B is a diagram of an example of a tube taken along line A-A of FIG. 5A.

FIG. 1 illustrates an example of a drape 100 having multiple regions with different tackiness. In some implementations, drape 100 may be used as part of a wound therapy system, as further described with reference to FIGS. 5A and 5B. Drape 100 includes a treatment region 102, a first region 103, a second region 104, a third region 106, and a fourth region 108 defined by one or more of first perimeter 110, second perimeter 112, third perimeter 114, fourth perimeter 116, fifth perimeter 118, and sixth perimeter 120. Treatment region 102 may be surrounded by first perimeter 110. First region 103 is located between second perimeter 112 and third perimeter 114, between fourth perimeter 116 and fifth perimeter 118, and outside of sixth perimeter 120. Second region 104 is located between first perimeter 110 and second perimeter 112. Third region 106 is located between third perimeter 114 and fourth perimeter 116. Fourth region 108 is located between fifth perimeter 118 and sixth perimeter 120.

In some implementations, drape 100 is an island drape, such that treatment region 102 is located in a center of drape 100. Treatment region 102 may not include adhesive and may be configured to cover a wound and/or define a treatment area. First region 103 may include a first adhesive material having a first tackiness. Second region 104 may include a second adhesive material having a second tackiness in a first phase and a third tackiness in a second phase. The third tackiness is greater than the second tackiness. For example, the first phase may be associated with a low tackiness state, and the second phase may be associated with a high tackiness state. The first adhesive material may be configured to maintain the first tackiness when the second adhesive material is in the second phase, such that first region 103 has a different tackiness than second region 104 when the second adhesive material is in the second phase.

In some implementations, the first tackiness is the same as the second tackiness. For example, the second adhesive, when in the first phase, has the same tackiness as the first adhesive material. To further illustrate, the second adhesive material may include the first adhesive material as well as at least one component (e.g., an additional component) that is not included in the first adhesive material, such as encapsulated adhesive, as a non-limiting example. In other implementations, the first tackiness is different from the second tackiness.

In some implementations, the second adhesive material includes the first adhesive material (having the lower tackiness) in addition to an additional component that contributes to the higher tackiness of the second adhesive material. As one example, the first adhesive material includes a silicone gel adhesive, and the second adhesive material includes a releasable acrylic adhesive. In such examples, the releasable acrylic adhesive may be disposed within silicone gel adhesive. For example, the releasable acrylic adhesive may be encapsulated in one or more shells when the second adhesive material is in the first phase, and the releasable acrylic adhesive is released when the second adhesive material is in the second phase.

As another example, the first adhesive material may include silicone gel adhesive, and the second adhesive material may include releasable rosin. The releasable rosin may be similarly encapsulated in one or more shells disposed in silicone gel adhesive included in the second adhesive material. As another example, the first adhesive material may include silicone gel adhesive, and the second adhesive material may include a releasable tackifier chemical compound. The tackifier chemical compound may be a chemical compound, such as a resin, a rosin, or a terpene, that increases the tackiness of the second adhesive material. The releasable tackifier chemical compound may be similarly encapsulated in one or more shells disposed in silicone gel adhesive included in the second adhesive material.

As yet another example, the first adhesive material may include silicone gel adhesive, and the second region may include releasable L-3, 4-dihydroxyphenylalanine, releasable L-3, 4-dihydroxyphenylalanine quinone, releasable dehydrodihdyroxyphenylalanine, or releasable phosphorylated senile. The releasable chemicals may be similarly encapsulated in one or more shells disposed in silicone gel adhesive included in the second adhesive material. In other implementations, other adhesive materials may be used for the first adhesive material and/or the second adhesive material.

In some implementations, the second adhesive material comprises a light switchable adhesive having the second tackiness in the first phase and the third tackiness in the second phase. The light switchable adhesive may be configured to transition from the first phase to the second phase based on receiving light. For example, the first adhesive material may include silicone gel adhesive, and the second adhesive material may include a light switchable adhesive that is deactivated in the first phase and activated in the second phase (e.g., to increase the tackiness from the second tackiness to the third tackiness).

Drape 100 may be repositionable with respect to a tissue site. For example, first region 103 and second region 104 are repositionable when the second adhesive material is in the first phase. To further illustrate, the first tackiness and the second tackiness (which may be the same) may be sufficiently low enough such that drape 100 can be removed and repositioned at the tissue site without causing trauma to the tissue site or surrounding tissue. However, the second region is not repositionable when the second adhesive material is in the second phase. For example, the third tackiness may correspond to sufficient bond/peel strength that second region 104 is not able to be repositioned. Accordingly, the second adhesive material should be transitioned from the first phase to the second phase, as further described herein, once drape 100 has been properly positioned.

Third region 106 and/or fourth region 108 may be similar to second region 104. For example, third region 106 may include a third adhesive material that has a fourth tackiness when in a first phase and a fifth tackiness when in a second phase, and fourth region 108 may include a fourth adhesive material that has a sixth tackiness when in a first phase and a seventh tackiness when in a second phase. In some implementations, the third adhesive material and the fourth adhesive material may be the same as the second adhesive material, such that the fourth tackiness and the sixth tackiness are the same as the second tackiness and the fifth tackiness and the seventh tackiness are the same as the third tackiness. In other implementations, the third adhesive material and/or the fourth adhesive material may be different than the second adhesive material. For example, the third adhesive material and/or the fourth adhesive material may include more (or less) of the additional encapsulated adhesive than the second adhesive material, or the third adhesive material and/or the fourth adhesive material may include different adhesive material than the second adhesive material. As an example, the third adhesive material may include more encapsulated acrylic adhesive than the second adhesive material, and the fourth adhesive material may include more encapsulated acrylic adhesive than the third adhesive material. As another example, the third adhesive material may include less encapsulated acrylic adhesive than the second adhesive material, and the fourth adhesive material may include less encapsulated acrylic adhesive than the third adhesive material. Accordingly, the third tackiness, the fifth tackiness, and the seventh tackiness may be different, at least in some implementations.

The regions may have the same or different shapes. For example, in the example of FIG. 1, second region 104 has an elliptical shape. Third region 106 also has an elliptical shape, and fourth region 108 has a rectangular shape. In other implementations, second region 104 (or third region 106 and/or fourth region 108) has a linear shape, a circular shape, a polygonal shape, or a different shape. Additionally, or alternatively, first region 103, second region 104, third region 106, and fourth region 108 may be located in various positions of drape 100. In some implementations, second region 104, third region 106, or fourth region 108 is disposed substantially within a center of drape 100. In other implementations, second region 104, third region 106, and/or fourth region 108 is disposed along an edge of drape 100. For example, in the example of FIG. 1, fourth region 108 is disposed along the edges of drape 100. In some other implementations, second region 104, third region 106, and/or fourth region 108 forms part of a grid pattern. The grid pattern enables a selectable area corresponding to the third tackiness (or the fifth tackiness and/or the seventh tackiness). A drape with regions in a grid pattern is further described herein with reference to FIG. 3.

Some of the reasons may transition phases through the receipt of energy input. For example, second region 104 may be configured to receive an energy input to transition the second adhesive material from the first phase to the second phase. Similarly, third region 106 may be configured to receive an energy input to transition the third adhesive material from the first phase to the second phase, and fourth region 108 may be configured to receive an energy input to transition the fourth adhesive material from the first phase to the second phase. Transitioning regions 104-108 from the respective first phase to the respective second phase increases the tackiness of the corresponding adhesive material.

The energy input may be applied in a variety of forms. In some implementations, the energy input includes pressure. In such implementations, the second adhesive material is configured to transition from the first phase to the second phase based on receiving more than a threshold amount of the pressure. For example, in implementations in which the second adhesive material includes encapsulated acrylic adhesive that is encapsulated in one or more shells, application of pressure to second region 104 may cause the shells (e.g., capsules) to break open and release the acrylic adhesive, thereby transitioning the second adhesive material from the first phase to the second phase and increasing the tackiness from the second tackiness to the third tackiness. The pressure may be applied by a user pressing down on second region 104 with a thumb or finger, as a non-limiting example. In some such implementations, the third adhesive material and/or the fourth adhesive material may similarly be configured to transition from the first phase to the second phase based on application of pressure to third region 106 and/or fourth region 108.

In some other implementations, the energy input includes ultraviolet light. In such implementations, the second adhesive material is configured to transition from the first phase to the second phase based on receiving the ultraviolet light for more than a threshold time period. For example, in implementations in which the second adhesive material includes encapsulated acrylic adhesive that is encapsulated in one or more shells, application of ultraviolet (UV) light to second region 104 may cause the shells (e.g., capsules) to break open or to disintegrate and release the acrylic adhesive, thereby transitioning the second adhesive material from the first phase to the second phase and increasing the tackiness from the second tackiness to the third tackiness. The UV light may be applied by a UV light source (e.g., an energy source) that is configured to direct UV light to second region 104 for a threshold period of time. In some implementations, the UV light may correspond to a UV light configured to generate incoherent light in the UV spectrum, or a particular subspectrum of the UV spectrum. Alternatively, the UV light may correspond to a UV laser, such as a gas laser, a laser diode, a solid-state laser, an excimer laser, or a combination thereof, configured to generate coherent light (e.g., a laser beam) having electromagnetic radiation of UV wavelengths. In some such implementations, drape 100 may include a removable protective film disposed on second region 104. For example, a UV protective film or cover may be disposed on second region 104 and may be removed by a user when the UV light is to be applied. The UV protective film or cover may prevent the shells from disintegrating too early and releasing the acrylic adhesive. In some such implementations, the third adhesive material and/or the fourth adhesive material may similarly be configured to transition from the first phase to the second phase based on application of UV light to third region 106 and/or fourth region 108.

In some other implementations, the energy input includes infrared light. In such implementations, the second adhesive material is configured to transition from the first phase to the second phase based on receiving the infrared light for more than a threshold time period. For example, in implementations in which the second adhesive material includes encapsulated acrylic adhesive that is encapsulated in one or more shells, application of infrared light to second region 104 may cause the shells (e.g., capsules) to break open or disintegrate and release the acrylic adhesive, thereby transitioning the second adhesive material from the first phase to the second phase and increasing the tackiness from the second tackiness to the third tackiness. The infrared light may be applied by an infrared light source (e.g., an energy source) that is configured to direct infrared light to second region 104 for a threshold period of time. In some such implementations, the infrared light source may include an infrared torch configured to generate incoherent light in the infrared spectrum, or a particular subspectrum of the infrared spectrum. Alternatively, the infrared light may correspond to an infrared laser, such as a gas laser, a laser diode, a solid-state laser, an excimer laser, or a combination thereof, configured to generate coherent light (e.g., a laser beam) having electromagnetic radiation of infrared wavelengths. In some such implementations, the third adhesive material and/or the fourth adhesive material may similarly be configured to transition from the first phase to the second phase based on application of infrared light to third region 106 and/or fourth region 108.

In some implementations, the energy input includes ultrasound. In such implementations, the second adhesive material is configured to transition from the first phase to the second phase based on receiving the ultrasound for more than a threshold time period. For example, in implementations in which the second adhesive material includes encapsulated acrylic adhesive that is encapsulated in one or more shells, application of ultrasound (e.g., ultrasound waves) to second region 104 may cause the shells (e.g., capsules) to break open or disintegrate and release the acrylic adhesive, thereby transitioning the second adhesive material from the first phase to the second phase and increasing the tackiness from the second tackiness to the third tackiness. The ultrasound waves may be applied by an ultrasound emitter (e.g., an energy source) that is configured to direct ultrasound waves to second region 104 for a threshold period of time. In some such implementations, the third adhesive material and/or the fourth adhesive material may similarly be configured to transition from the first phase to the second phase based on application of ultrasound to third region 106 and/or fourth region 108.

In some implementations, the energy input includes heat. In such implementations, the second adhesive material is configured to transition from the first phase to the second phase based on receiving more than a threshold amount of the heat. For example, in implementations in which the second adhesive material includes encapsulated acrylic adhesive that is encapsulated in one or more shells, application of heat to second region 104 may cause the shells (e.g., capsules) to break open or disintegrate and release the acrylic adhesive, thereby transitioning the second adhesive material from the first phase to the second phase and increasing the tackiness from the second tackiness to the third tackiness. The heat may be applied by a heat source (e.g., an energy source) that is configured to direct heat to second region 104 in a threshold amount. In some such implementations, the third adhesive material and/or the fourth adhesive material may similarly be configured to transition from the first phase to the second phase based on application of heat to third region 106 and/or fourth region 108.

In some implementation, the energy input includes visible light. In such implementations, the second adhesive material is configured to transition from the first phase to the second phase based on receiving the visible light for more than a threshold time period. For example, the second adhesive material may be a light switchable adhesive with two phases. The first phase may be a low-tack state (e.g., associated with the second tackiness), and the second phase may be a high-tack state (e.g., associated with the third tackiness). Application of the visible light for a threshold time period to second region 104 may cause the light switchable adhesive (e.g., the second adhesive material) to transition from the first phase to the second phase and thereby increase the tackiness from the second tackiness to the third tackiness. In some implementations, the light switchable adhesive may have three phases, and the third phase may be associated with a low-tack state to enable easy removal of drape 100. In some such implementations, the third adhesive material and/or the fourth adhesive material may similarly include a light switchable adhesive configured to transition from the first phase to the second phase based on application of visible light to third region 106 and/or fourth region 108.

Although regions 104-108 include corresponding adhesive materials that change phases based on the energy input, the first adhesive material corresponding to first region 103 is configured to maintain the first tackiness while the other adhesive materials are in the second phase. Thus, a majority of drape 100 has the first tackiness (e.g., a low tackiness) even when the other adhesive materials are in the second phase, making removal of drape 100 easier and less likely to cause trauma to the skin surrounding the tissue site.

In some implementations, the second adhesive material is configured to release one or more colorimetric indicators that indicate a position of second region 104 when the second adhesive material is in the second phase. For example, in addition to a second adhesive (e.g., an acrylic adhesive, as a non-limiting example) being encapsulated in one or more shells (e.g., capsules), one or more colorimetric indicators, such as dyes or pigments, may also be encapsulated in the one or more shells. The one or more colorimetric indicators, when released from encapsulation, may change a color of second region 104. For example, the dye may change a color of second region 104 to a particular color, such as red, blue, green, or yellow, to indicate that the high-tack phase is in effect. Thus, a user may be able to visually perceive that the second adhesive has transitioned from the first phase to the second phase. In some such implementations, the third adhesive material and/or the fourth adhesive material may similarly include colorimetric indicators configured to change a color of third region 106 or fourth region 108.

In some implementations, a drape (e.g., 100) includes a first region (e.g., 103) including a first adhesive material. The first adhesive material has a first tackiness. The drape further includes a second region (e.g., 104) including a second adhesive material. The second adhesive material has a second tackiness in a first phase and a third tackiness in a second phase. The third tackiness is greater than the second tackiness. The first adhesive material is configured to maintain the first tackiness when the second adhesive is in the second phase.

In some implementations, a drape (e.g., 100) includes a first region (e.g., 103) including a first adhesive material. The first adhesive material has a first tackiness. The drape further includes a second region (e.g., 104) including one or more shells of an encapsulated second adhesive material. The one or more shells are configured to release the second adhesive material responsive to receipt of an energy input at the second region. The second adhesive material has a second tackiness that is greater than the first tackiness.

Thus, FIG. 1 illustrates a drape (e.g., drape 100) with different regions having different tackiness when corresponding adhesive materials are in the second phase. When the corresponding adhesive materials are in the first phase, an entirety of drape 100 has low enough tackiness to be repositionable about a tissue site. Thus, a user may be able to reposition drape 100 without causing trauma to their skin. Skin prep and wipes are not required prior to setting drape 100. Additionally, because only portions of drape 100 (e.g., regions 104-108) have higher tackiness when the corresponding adhesive materials are in the second state, drape 100 may be removable without causing trauma to the skin surrounding the tissue site and discomfort to the user. This may be especially helpful to patients with sensitive or friable skin. Additionally, the high tackiness of the particular regions is sufficient to prevent or mitigate leaks and to provide sufficient bond/peel strength to maintain the drape's attachment to the tissue site.

In some implementations, the tack values vary qualitatively from the first phase to the second phase. For example, from the first phase to the second phase, the tackiness may increase 5% to 500%, preferably 35% to 200%, based on the Polyken Probe Method. Additionally, the peel strength may vary qualitatively from the first phase to the second phase. For example, the peel strength in the first phase may be in the range of 0.15 to 5 Newtons (N)/centimeter (cm), preferably from 0.25 to 3 N/cm, based on the 180 degree steel peel method. In the second phase, the peel strength may be increased 5% to 500%, preferably 10% to 50% of the original value.

Figure 2:
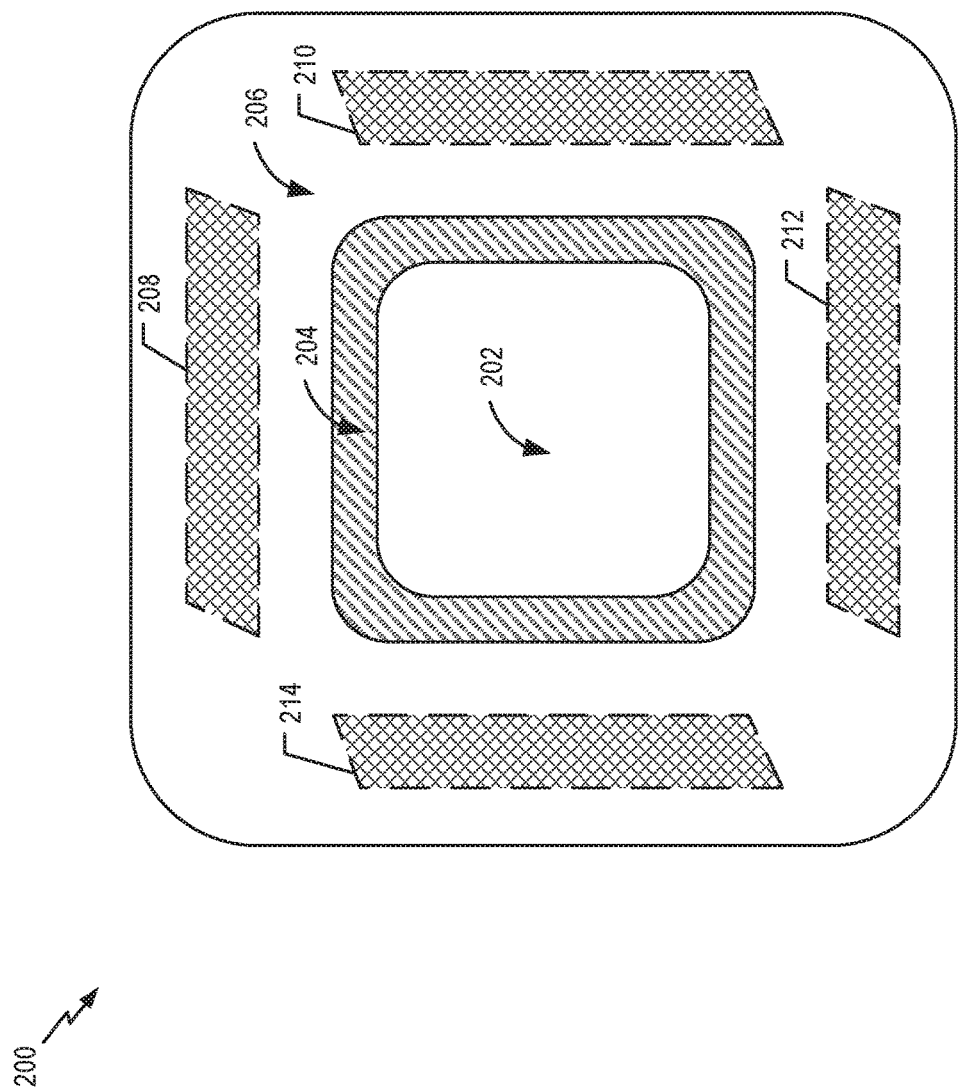
FIG. 2 is a diagram of another example of a drape having multiple regions with different tackiness.

FIG. 2 illustrates an example of a drape 200 having different regions with different tackiness. Drape 200 includes a treatment region 202, a treatment adhesive region 204, a first region 206, a second region 208 (e.g., a shaded region), a third region 210 (e.g., a shaded region), a fourth region 212 (e.g., a shaded region), and a fifth region 214 (e.g., a shaded region). Treatment region 202 may be located within the middle of drape 200 (e.g., drape 200 may be an island drape), treatment adhesive region 204 may surround treatment region 202, first region 206 may correspond to a remainder of drape 200 that is not encompassed by treatment region 202, treatment adhesive region 204, second region 208, third region 210, fourth region 212, and fifth region 214.

Treatment region 202 may be configured to cover a wound and may not include adhesive material. Treatment adhesive region 204 may include an adhesive material to attach treatment adhesive region 204 to tissue. Treatment adhesive region 204 may have the same type of adhesive material as first region 206 or regions 208-214. Although illustrated in the example of FIG. 2, treatment adhesive region 204 is optional and may not be included in some implementations. In such implementations, the area corresponding to treatment adhesive region 204 may be included in treatment region 202 or may be included in first region 206.

First region 206 may include a first adhesive material having a first tackiness. Second region 208 may include a second adhesive material that has a second tackiness in a first phase and a third tackiness in a second phase. The third tackiness is greater than the second tackiness. Third region 210 may include a third adhesive material that has a fourth tackiness in a first phase and a fifth tackiness in a second phase. The fifth tackiness is greater than the fourth tackiness. Fourth region 212 may include a fourth adhesive material that has a sixth tackiness in a first phase and a seventh tackiness in a second phase. The seventh tackiness is greater than the sixth tackiness. Fifth region 214 may include a fifth adhesive material that has an eighth tackiness in a first phase and a ninth tackiness in a second phase. The ninth tackiness is greater than the eighth tackiness. In some implementations, the second tackiness, the fourth tackiness, the sixth tackiness, and the eighth tackiness are the same as the first tackiness, such that an entirety of drape 200 has the same tackiness when the adhesive materials are in the first phase. In some implementations, the third tackiness, the fifth tackiness, the seventh tackiness, and the ninth tackiness are the same. In other implementations, one or more of the third tackiness, the fifth tackiness, the seventh tackiness, and the ninth tackiness are different.

FIG. 2 illustrates a smaller drape than FIG. 1. For smaller drapes, regions of high tackiness along the edges may be more helpful in preventing or mitigating leaks and maintaining the attachment to the tissue site. Thus, second region 208 is disposed along a first edge, third region 210 is disposed along a second edge, fourth region 212 is disposed along a third edge, and fifth region 214 is disposed along a fourth edge. In the example of FIG. 2, regions 208-214 have a polygon shape. In other implementations, regions 208-214 may have other shapes. Drape 200 of FIG. 2 may be configured for use with a pressurized wound therapy system, as further described with reference to FIGS. 5A and 5B.

As described with reference to FIG. 1, adhesive materials corresponding to regions 208-214 may be transitioned from the first phase to the second phase by receipt of an energy source at regions 208-214. In some implementations, the energy source may be one of the group consisting of: visible light, ultraviolet light, infrared light, ultrasound, pressure, and heat. In other implementations, other types of energy may be applied to regions 208-214 to transition the corresponding adhesive materials from the first phase to the second phase.

Figure 3:
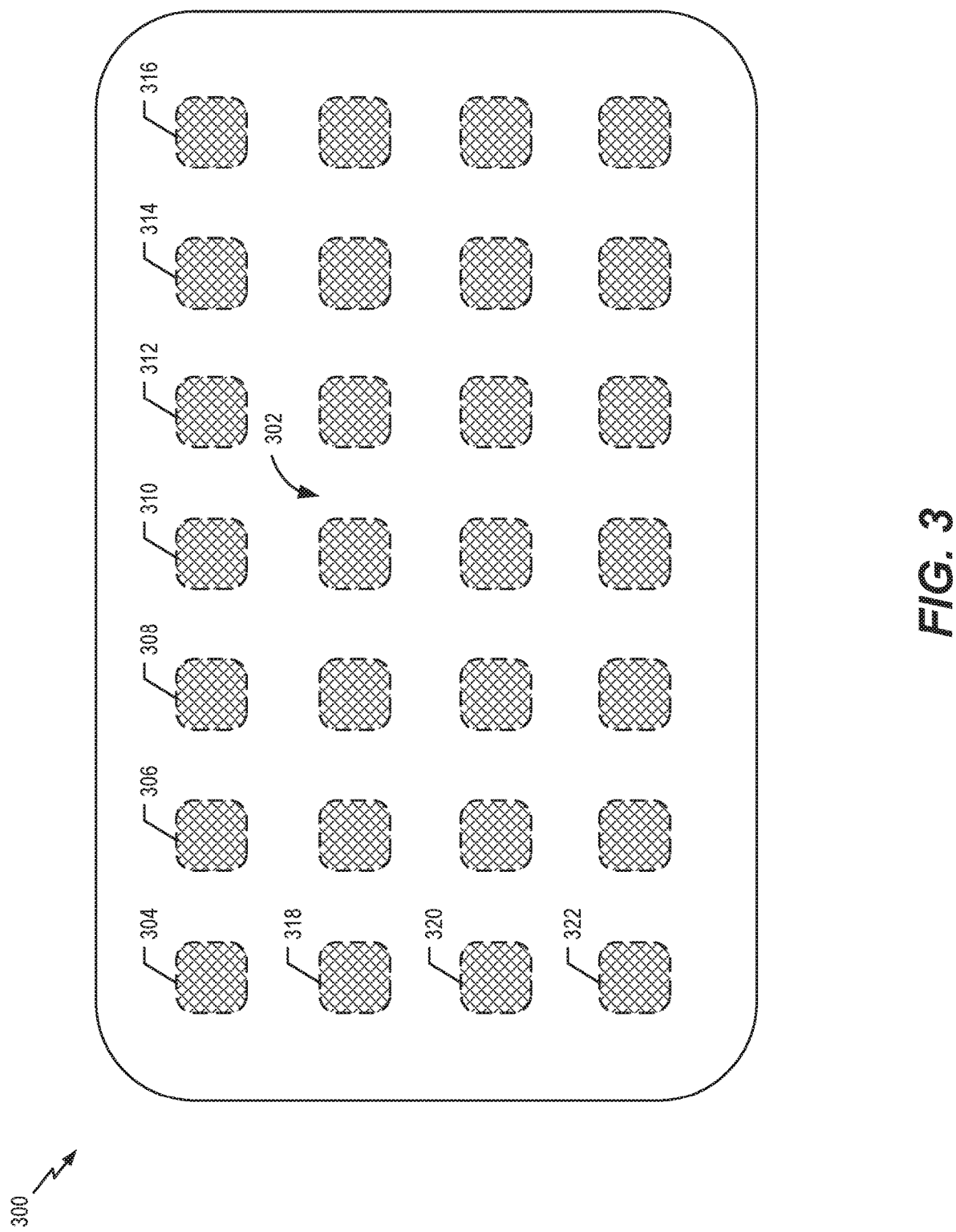
FIG. 3 is a diagram of another example of a drape having multiple regions with different tackiness.

FIG. 3 illustrates an example of a drape 300 having different regions with different tackiness. Drape 300 includes a first region 302 and illustrative regions 304, 306, 308, 310, 312, 314, 316, 318, 320, and 322. Regions 304-322 form a grid pattern within drape 300. For example, regions 302-316 form a first row of the grid pattern, and regions 304 and 318-322 for a first column of the grid pattern. Although four rows and seven columns are illustrated, in other implementations, there may be more than four or fewer than four rows and/or more than seven or fewer than seven columns.

As described with reference to FIG. 1, adhesive materials corresponding to regions 304-322 may be transitioned from the first phase to the second phase by receipt of an energy source at regions 304-322. In some implementations, the energy source may be one of the group consisting of: visible light, ultraviolet light, infrared light, ultrasound, pressure, and heat. In other implementations, other types of energy may be applied to regions 304-322 to transition the corresponding adhesive materials from the first phase to the second phase.

Drape 300 includes a grid pattern to enable users to select which regions to transition to the higher tack second phase. For example, a user may apply energy to the regions where higher tackiness is desired, and may not apply energy to regions where higher tackiness is not desired. Accordingly, a user can define a wound/treatment area and/or define a higher adhesive area or areas selectively. Thus, drape 300 may be more versatile than drapes that include pre-set regions of high tackiness.

Although described as a drape 300 in FIG. 3, drape 300 may include or correspond to a portion of a drape of another drape described herein. For example, the grid pattern of drape 300 may be used in one or more of regions 104-108 of drape 100.

Figure 4:
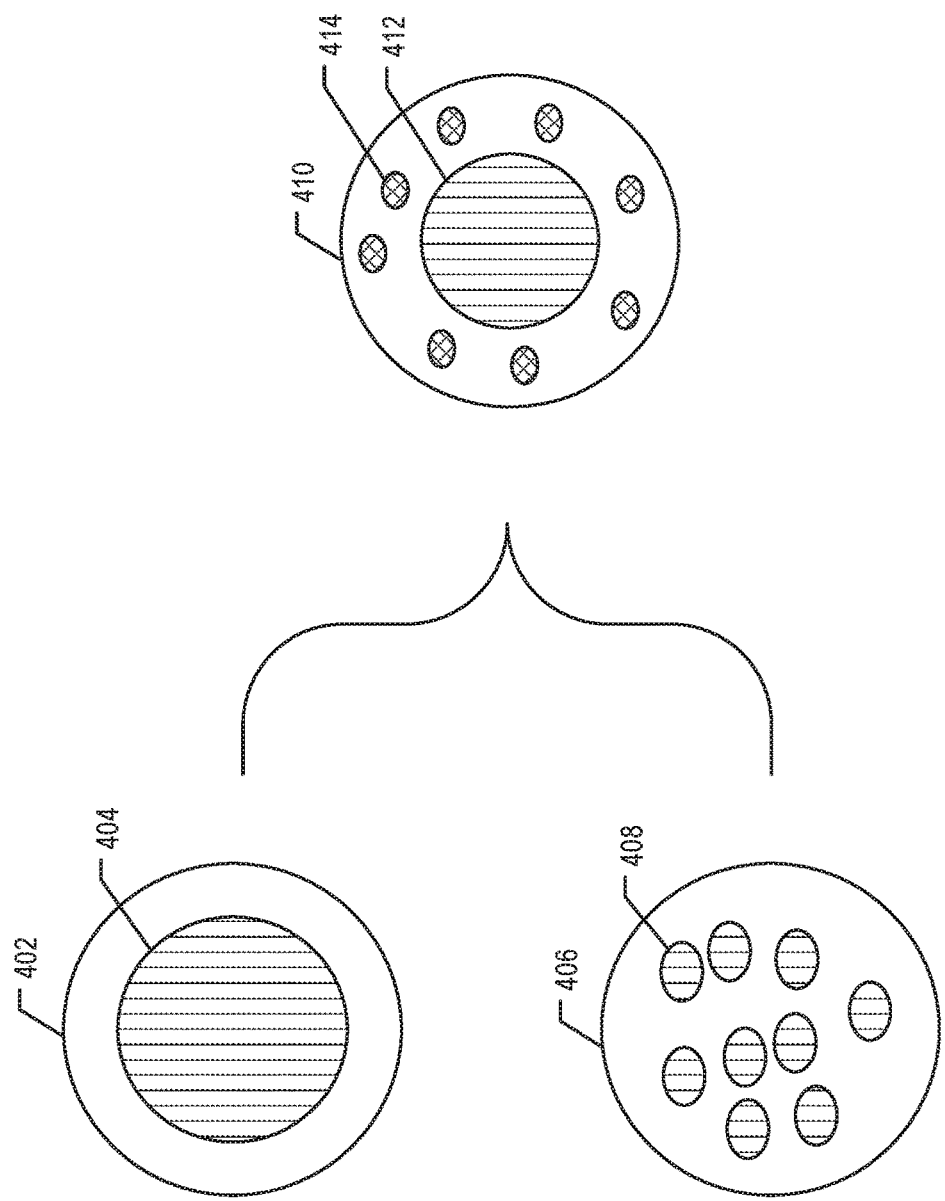
FIG. 4 is a diagram of an example of adhesive materials.

FIG. 4 illustrates examples of adhesive materials. FIG. 4 illustrates first adhesive material 402 and second adhesive material 406, each in the first phase. First adhesive material 402 includes an encapsulated adhesive 404. For example, encapsulated adhesive 404 may include an acrylic adhesive, as a non-limiting example. Second adhesive material 406 includes one or more encapsulated adhesives in one or more shells, such as illustrative shell 408. For example, one or more shells may encapsulate acrylic adhesive, as a non-limiting example.

Additionally, FIG. 4 illustrates adhesive material 410 in the second phase. When in the second phase, adhesive material 410 includes a releasable adhesive 412 which increases that tackiness of adhesive material 410. Additionally, adhesive material 410 includes released colorimetric indicators, such as illustrative colorimetric indicator 414. The colorimetric indicators may include dyes, pigments, etc., that cause a region of a drape corresponding to adhesive material 410 to change color. For example, the color may be red, blue, green, yellow, or another color. By changing a color of a region of the drape, a user may understand that the corresponding adhesive material (e.g., adhesive material 410) has transitioned to the second phase (e.g., is in the high tack state).

In some implementations, encapsulated adhesive 404 or one or more encapsulated adhesives (including shell 408) may be encapsulated in a thicker shell. Such thicker shell may require longer exposure time to UV, infrared, or ultrasound before release of the encapsulated adhesive. For example, the thicker shell may have an exposure time of 30 seconds to 5 minutes, as non-limiting examples. The thicker shell may reduce or prevent accidental release of more tacky adhesives, which can attach to tissue with higher bond/peel strength. In some implementations, the thicker shell may also encapsulate one or more colorimetric indicators, such that the color of the region of high tack adhesive changes when the high tack adhesive is released. The color may be different than the implementation illustrated in FIG. 4, due to the extended length of application of UV/infrared/ultrasound, selection of different colorimetric indicators, or both.

In some implementations, the shell is not thicker but instead breaks down slower. In still other implementations, the shell breaks down using a different type of input. For example, shells around low-tack adhesive may be broken down by ultrasound, while shells around high-tack adhesive may be broken down by ultraviolet light. The exposure time for the different shells could be the same or different.

FIG. 5A shows a perspective view of an illustrative system 500 (e.g., a therapy system) for providing wound therapy. System 500 may include a therapy device 510, a tube 514, a dressing 516, and, optionally, an energy source 512. System 500 is configured to provide therapy (e.g., oxygen therapy, positive-pressure therapy, negative-pressure therapy, or a combination thereof) at a tissue site 520 associated with a target area of a patient. For example, dressing 516 may be in fluid communication with tissue site 520 and may be in fluid communication with therapy device 510 via tube 514. In some implementations, system 500 may include one or more components commercially available through and/or from KCI USA, Inc. of San Antonio, Tex., U.S.A., and/or its subsidiary and related companies (collectively, "KCI"). In some implementations, system 500 is a disposable and/or discreet therapy system. For example, the therapy system is sized to fit underneath clothing and/or to attach to clothing of a person. An illustrative, non-limiting example of commercially available discreet therapy systems include a "V.A.C. VIA"™ Therapy System available from Kinetic Concepts, Inc. (KCI) of San Antonio, Tex.

Therapy device 510 (e.g., a treatment apparatus) is configured to provide therapy to tissue site 520 via tube 514 and dressing 516. For example, therapy device 510 may include a pressure source (e.g., a negative-pressure source, such as a pump, or a positive-pressure source, such as a pressurized oxygen container, an oxygen concentrator, or an oxygen collector) configured to be actuatable (and/or actuated) to apply pressure differential relative to ambient conditions to dressing 516. As illustrative, non-limiting examples, positive-pressure applied to a tissue site may typically ranges between 5 millimeters mercury (mm Hg) (667 pascals (Pa)) and 30 mm Hg (4.00 kilo (k) Pa). Common therapeutic ranges are between 10 mm Hg (1.33 kPa) and 25 mm Hg (3.33 kPa). As illustrative, non-limiting examples, reduced-pressure applied to a tissue site may typically ranges between −5 millimeters mercury (mm Hg) (−667 pascals (Pa)) and −500 mm Hg (−66.7 kilo (k) Pa). Common therapeutic ranges are between −75 mm Hg (−9.9 kPa) and −300 mm Hg (−39.9 kPa).

In some implementations, the therapy device 510 includes a reduced-pressure source, such as a vacuum source (e.g., a pump and/or the like), configured to be actuatable (and/or actuated) to apply reduced-pressure (e.g., negative pressure) to dressing 516. In some implementations, therapy device 510 may alternate between providing positive-pressure therapy and negative-pressure therapy to the dressing 516, may provide positive-pressure therapy to a first portion of the dressing 516 and negative-pressure therapy to a second portion of the dressing 516, may provide no positive or negative pressure, or a combination thereof. In some such implementations, the therapy device 510 can provide positive-pressure therapy and negative-pressure therapy to the dressing 516 at the same time (e.g., partially concurrently).

In some implementations, therapy device 510 includes a canister to receive fluid from tissue site 520 or to provide fluid to tissue site 520. In some implementations, the canister is internal to and/or integrated with therapy device 510. In other implementations, the canister is external to therapy device 510.

Therapy device 510 may also include one or more other components, such as a sensor, a processing unit/controller (e.g., a processor), an alarm indicator, a memory, a database, software, a display device, a user interface, a regulator, and/or another component, that further facilitate positive-pressure therapy or negative-pressure therapy. Additionally, or alternatively, therapy device 510 may be configured to receive fluid, exudate, and or the like via dressing 516 and tube 514. Therapy device 510 may include one or more connectors, such as a representative connector 538. Connector 530 is configured to be coupled to tube 514. Additionally, or alternatively, therapy device 510 may include one or more sensors, such a pressure sensor (e.g., a pressure transducer). The one or more sensors may be configured to enable therapy device 510 to monitor and/or sense a pressure associated with tube 514 and/or dressing 516.

Tube 514 includes one or more lumens (e.g., one or more through conduits), such as a single lumen conduit or multiple single-lumen conduits. Tube 514 (e.g., a least one of the one or more lumens) is configured to enable fluid communication between therapy device 510 and dressing 516. For example, fluid(s) and/or exudate can be communicated between therapy device 510 and dressing 516, and/or one or more pressure differentials (e.g., positive-pressure, negative pressure, or both) can be applied by therapy device 510 to dressing 516. As an illustrative, non-limiting illustration, tube 514 is configured to deliver at least pressurized oxygen from therapy device 510 to dressing 516 to establish positive-pressure. Communication of fluid(s) and application of a pressure differential can occur separately and/or concurrently.

In some implementations, tube 514 may include multiple lumens, such as a primary lumen (e.g., a negative-pressure/fluid lumen) for application of negative-pressure and/or communication of fluid, and one or more secondary lumens proximate to or around the primary lumen. The one or more secondary lumens (e.g., one or more ancillary/peripheral lumens) may be coupled to one or more sensors (of therapy device 510), coupled to one or more valves, as an illustrative, non-limiting example. Although tube 514 is described as a single tube, in other implementations, system 500 may include multiple tubes, such as multiple distinct tubes coupled to therapy device 510, dressing 516, or both.

As used herein, a "tube" broadly refers to a tube, pipe, hose, conduit, or other structure with one or more lumens adapted to convey fluid, exudate, and/or the like, between two ends. In some implementations, a tube may be an elongated, cylindrical structure with some flexibility; however, a tube is not limited to such a structure. Accordingly, tube may be understood to include multiple geometries and rigidity. Tube 514 includes one or more lumens (e.g., one or more through conduits), such as a single lumen conduit or multiple single-lumen conduits. Tube 514 (e.g., a least one of the one or more lumens) is configured to enable fluid communication between therapy device 510 and dressing 516. For example, fluid(s) and/or exudate can be communicated between therapy device 510 and dressing 516, and/or one or more pressure differentials (e.g., positive-pressure, negative pressure, or both) can be applied by therapy device 510 to dressing 516. As an illustrative, non-limiting illustration, tube 514 is configured to deliver at least pressurized oxygen from therapy device 510 to dressing 516 to establish positive-pressure. Communication of fluid(s) and application of a pressure differential can occur separately and/or concurrently.

Referring to FIG. 5B, an illustrative example of a cross-section of tube 514 (in which tube 514 comprises a single lumen) along line A-A of FIG. 5A is shown. Tube 514 may include a primary lumen 521 (e.g., a negative-pressure/fluid lumen). In other implementations, tube 514 may include one or more secondary lumens, such as a positive-pressure/fluid lumen, one or more sense lumens, etc., or a combination thereof. Although tube 514 has been described and/or shown as having a circular cross-sectional shape, in other implementations, tube 514 may have a cross-sectional shape other than a circle, such as an oval, triangle, quadrilateral, pentagon, star, or another shape, as illustrative, non-limiting examples.

Referring to FIG. 5A, dressing 516 includes a connector 530 (also referred to as a dressing connection pad or a pad), a drape 532, and a manifold 534 (also referred to as a distribution manifold or an insert). Drape 532 may be coupled to connector 530. To illustrate, drape 532 may be coupled to connector 530 via an adhesive, a separate adhesive drape over at least a portion of connector 530 and at least a portion of drape 532, or a combination thereof, as illustrative, non-limiting examples.

Drape 532 may be configured to couple dressing 516 at tissue site 520 and/or to provide a seal to create an enclosed space (e.g., an interior volume) corresponding to tissue site 520. For example, drape 532 may be configured to provide a fluid seal between two components and/or two environments, such as between a sealed therapeutic environment and a local ambient environment. To illustrate, when coupled to tissue site 520, drape 532 is configured to maintain a pressure differential (provided by a positive-pressure source or a negative-pressure source) at tissue site 520. Drape 532 may include a drape aperture that extends through drape 532 to enable fluid communication between device and target tissue. Drape 532 may be configured to be coupled to tissue site 520 via an adhesive, such as a medically acceptable, pressure-sensitive adhesive that extends about a periphery, a portion, or an entirety of drape 532. Additionally, or alternatively, drape 532 may be coupled to tissue site 520 via a double-sided drape tape, paste, hydrocolloid, hydrogel, and/or other sealing device or element, as illustrative, non-limiting examples.

In some implementations, drape 532 may include a first region 550 that includes a first adhesive material and a second region 552 that includes a second adhesive material. The first adhesive material may have a first tackiness (e.g., peel strength). The second adhesive material may have a second tackiness when in a first phase and a third tackiness when in a second phase. The third tackiness is greater than the second tackiness. In some implementations, the second tackiness is the same as the first tackiness. The second adhesive material may be transitioned from the first phase to the second phase by receipt of an energy input from energy source 512, as further described herein.

Drape 532 may include an impermeable or semi-permeable, elastomeric material, as an illustrative, non-limiting example. In some implementations, drape 532 may be liquid/gas (e.g., moisture/vapor) impermeable or semi-permeable. Examples of elastomers may include, but are not limited to, natural rubbers, polyisoprene, styrene butadiene rubber, chloroprene rubber, polybutadiene, nitrile rubber, butyl rubber, ethylene propylene rubber, ethylene propylene diene monomer, chlorosulfonated polyethylene, polysulfide rubber, polyurethane (PU), EVA film, co-polyester, and silicones. In some implementations, drape 532 may include the "V.A.C.® Drape" commercially available from KCI. Additional, specific non-limiting examples of materials of drape 532 may include a silicone drape, 3M Tegaderm® drape, and a polyurethane (PU) drape such as one available from Avery Dennison Corporation of Pasadena, Calif. An additional, specific non-limiting example of a material of the drape 532 may include a 30 micrometers (μm) matt polyurethane film such as the Inspire™ 2317 manufactured by Exopack™ Advanced Coatings of Matthews, N.C.

Manifold 534 is configured to be positioned on and/or near tissue site 520, and may be secured at the tissue site 520, such as secured by drape 532. The term "manifold" as used herein generally refers to a substance or structure that may be provided to assist in applying a pressure differential (e.g., negative-pressure differential) to, delivering fluids to, or removing fluids and/or exudate from a tissue site and/or target tissue. The manifold typically includes a plurality of flow channels or pathways that distribute fluids provided to and removed from the tissue site. In an illustrative implementation, the flow channels or pathways are interconnected to improve distribution of fluids provided to or removed from the tissue site. Manifold 534 may be a biocompatible material that may be capable of being placed in contact with the tissue site and distributing positive and/or negative-pressure to the tissue site. Manifold 534 may include, without limitation, devices that have structural elements arranged to form flow channels, such as foam, cellular foam, open-cell foam, porous tissue collections, liquids, gels, and/or a foam that includes, or cures to include, flow channels, as illustrative, non-limiting examples. Additionally, or alternatively, manifold may include polyethylene, a polyolefin, a polyether, polyurethane, a co-polyester, a copolymer thereof, a combination thereof, or a blend thereof.

In some implementations, manifold 534 is porous and may be made from foam, gauze, felted mat, or other material suited to a particular biological application. In a particular implementation, manifold 534 may be a porous foam and may include a plurality of interconnected cells or pores that act as flow channels. The foam (e.g., foam material) may be either hydrophobic or hydrophilic. As an illustrative, non-limiting example, the porous foam may be a polyurethane, open-cell, reticulated foam such as GranuFoam® material manufactured by Kinetic Concepts, Incorporated of San Antonio, Tex.

In some implementations, manifold 534 is also used to distribute fluids such as medications, antibacterials, growth factors, and other solutions to the tissue site. Other layers may be included in or on manifold 534, such as absorptive materials, wicking materials, hydrophobic materials, and hydrophilic materials. In an implementation in which the manifold 534 includes a hydrophilic material, manifold 534 may be configured to wick fluid away from tissue site 520 and to distribute negative pressure and/or positive-pressure to tissue site 520. The wicking properties of manifold 534 may draw fluid away from the tissue site 520 by capillary flow or other wicking mechanisms. An illustrative, non-limiting example of a hydrophilic foam is a polyvinyl alcohol, open-cell foam such as V.A.C. WhiteFoam® dressing available from Kinetic Concepts, Inc. of San Antonio, Tex. Other hydrophilic foams may include those made from polyether and/or foams that have been treated or coated to provide hydrophilicity.

In some implementations, manifold 534 is constructed from bioresorbable materials that do not have to be removed from tissue site 520 following use of the system 500. Suitable bioresorbable materials may include, without limitation, a polymeric blend of polylactic acid (PLA) and polyglycolic acid (PGA). The polymeric blend may also include without limitation polycarbonates, polyfumarates, and capralactones. Manifold 534 may further serve as a scaffold for new cell-growth, or a scaffold material may be used in conjunction with manifold 534 to promote cell-growth. A scaffold may be a substance or structure used to enhance or promote the growth of cells or formation of tissue, such as a three-dimensional porous structure that provides a template for cell growth. Illustrative examples of scaffold materials include calcium phosphate, collagen, PLA/PGA, coral hydroxy apatites, carbonates, or processed allograft materials. Although a manifold 534 is illustrated in FIG. 5A, in other implementations, dressing 516 does not include manifold 534. In such implementations, drape 532 of dressing 516 is coupled to connector 530.

Connector 530 includes a body 542 (e.g., a housing) and a base 544, and is configured to be coupled to tube 514 via an interface 546 (e.g., a port). Base 544 is configured to be coupled to dressing 516. For example, base 544 may be coupled, such as via an adhesive, to drape 532 and/or manifold 534. In some implementations, base 544 comprises a flange that is coupled to an end of body 542 and/or is integrally formed with body 542. Connector 530, such as body 542, base 544, interface 546, or a combination thereof, may be made of rigid material and/or a semi-rigid material. In a non-limiting example, connector 530 may be made from a plasticized polyvinyl chloride (PVC), polyurethane, cyclic olefin copolymer elastomer, thermoplastic elastomer, poly acrylic, silicone polymer, or polyether block amide copolymer. In some implementations, connector 530 is formed of a semi-rigid material that is configured to expand when under a force, such as positive-pressure greater than or equal to a particular amount of pressure. Additionally or alternatively, connector 530 may be formed of a semi-rigid material that is configured to collapse when under a force, such as reduced-pressure less than or equal to a threshold pressure.

Body 542 includes one or more channels or one or more conduits that extend from and/or are coupled to interface 546. To illustrate, body 542 may include a primary channel configured to be coupled in fluid communication with a primary lumen (e.g., 521) of tube 514. The primary channel may be coupled to a cavity (e.g., a tissue cavity partially defined by body 542) having an aperture open towards manifold 534 (and/or towards tissue site 520). For example, the primary channel may include a first opening associated with interface 546 and a second opening (distinct from the aperture of the cavity) associated with the cavity. Thus, the primary channel may define a through channel of body 542 to enable fluid communication between interface 546 and tissue site 520.

Body 542 includes a channel (e.g., a through channel) having a first aperture open opposite dressing 516 and a second aperture open towards dressing 516. For example, the first aperture is located on an outer surface side (e.g., an ambient environment surface) of connector 530 and the second aperture is located on an inner surface side (e.g., a tissue facing side) of connector 530. The second aperture is configured to be coupled to one or more lumens of tube 514, such as coupled via the cavity. Illustrative, non-limiting examples of commercially available connectors include a "V.A.C. T.R.A.C.® Pad," or "Sensa T.R.A.C.® Pad" available from Kinetic Concepts, Inc. (KCI) of San Antonio, Tex.

Energy source 512 is configured to provide an energy input to transition the second adhesive material (corresponding to second region 552 of drape 532) from the first phase to the second phase. Energy source 512 may include or correspond to ambient lighting, a visible light device (such as a lamp), an infrared torch, a UV torch, a visible light torch, a dual light torch, or a combination thereof. Alternatively, energy source 512 may include or correspond to an ultrasound emitter. Alternatively, energy source 512 may include or correspond to a heat source. Alternatively, energy source 512 may include or correspond to a user, such as a user's thumb or finger that applies pressure to second region 552, or a device to apply pressure to second region 552. In some implementations, energy source 512 is included in or integrated within therapy device 510.

During operation of system 500, dressing 516 is coupled to tissue site 520 over a wound. Additionally, dressing 516 is coupled to therapy device 510 via tube 514. Drape 532 is coupled over tissue site 520 to create a seal. For example, while the second adhesive material (corresponding to second region 552 of drape 532) is in the first phase, drape 532 may be attached to tissue site 520. While the second adhesive material is in the first phase, drape 532 may be repositionable. For example, if drape 532 is incorrectly attached, drape 532 (or a portion thereof) may be removed from tissue site 520 and repositioned. After drape 532 is positioned as desired, an energy input may be applied by energy source 512 to second region 552 to cause the second adhesive material to transition from the first phase to the second phase. As a non-limiting example, application of the energy input may cause encapsulated acrylic adhesive to be released, thereby increasing the tackiness of the second adhesive material from the second tackiness (e.g., a low tack state) to the third tackiness (e.g., a high tack state).

Negative-pressure or positive-pressure can be applied to dressing 516 (e.g., an interior volume of dressing 516) by a pump (e.g., a pressure source). A pressure differential, such as positive-pressure, can be generated and/or applied to dressing 516 (e.g., the interior volume of dressing 516) by a pressure source associated with therapy device 510. When positive-pressure is generated and/or applied to dressing 516, fluid or medication from therapy device 510, such as from the canister, may be transported to dressing 516. Furthermore, in some implementations, reduced-pressure can be applied to dressing 516 (e.g., the interior volume of dressing 516 or a second interior volume of the dressing 516) by a reduced-pressure source associated with therapy device 510. When reduced-pressure is applied to dressing 516 (e.g., when vacuum pressure is generated, fluid, exudate, or other material within dressing 516 may be transported to the canister of therapy device 510.

After operation, such as completion of therapy, system 500 may be disconnected and components thereof removed from tissue site 520. For example, drape 532 may be removed from tissue site 520. Because only a portion of drape 532 (e.g., second region 552) has a high tackiness, removal of drape 532 may not cause trauma to the skin or pain to the user.

In some implementations, a system includes a drape (e.g., 530), a wound therapy device (e.g., 510) configured to apply pressure to a tissue site (e.g., 520), and a connector (e.g., 514) configured to couple the wound therapy device to the drape. In some such implementations, the system further includes a light source (e.g., 512) configured to emit light to the second region (e.g., 552) of the drape to transition the second adhesive material from the first phase to the second phase. In some such implementations, the light includes visible light, infrared light, or ultraviolet light. Alternatively, the system may further include an ultrasound emitter (e.g., 512) configured to emit ultrasound to the second region of the drape to transition the second adhesive material from the first phase to the second phase. Alternatively, the system may further include a heat source (e.g., 512) configured to emit heat to the second region of the drape to transition the second adhesive material from the first phase to the second phase.

Thus, drape 532 can be adhered to a patient with all regions in a low tack state (e.g., having the first tackiness or the second tackiness) to be painlessly and easily repositioned. Once drape 532 is securely and correctly attached, the second adhesive (corresponding to second region 552) can be transitioned from the first phase to the second phase to increase the tackiness to the third tackiness. Increasing the tackiness reduces or mitigates leaks and provides sufficient bond/peel strength to keep drape 532 attached to tissue site 520. Additionally, because only a portion of drape 532 has the high tackiness (e.g., the third tackiness), once therapy is complete, drape 532 may be removed without causing trauma to the skin or pain to the user.

Figure 6:
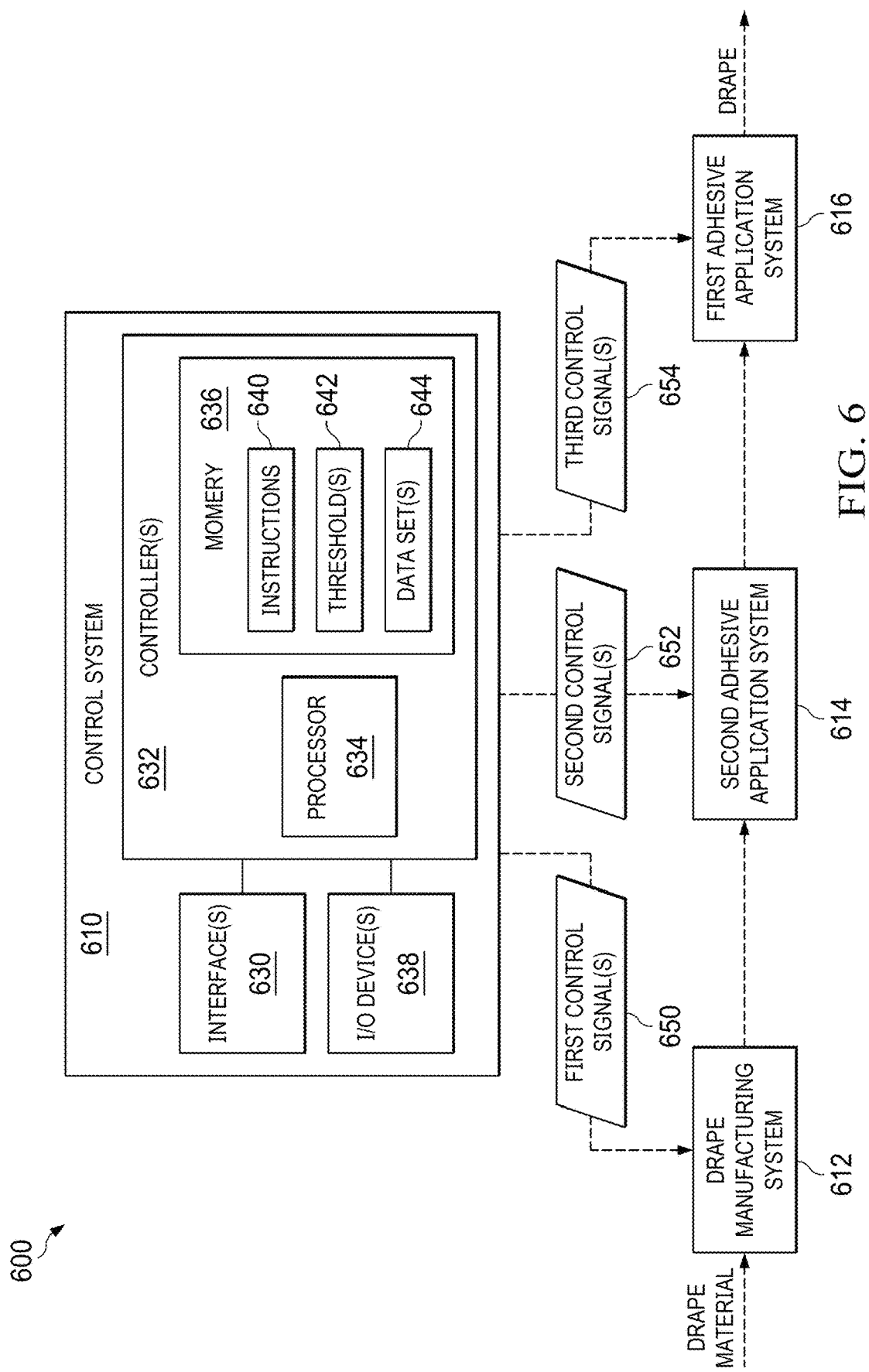
FIG. 6 is a block diagram of an example of a manufacturing system for manufacturing a drape having multiple regions with different tackiness.

Referring to FIG. 6, a block diagram of a manufacturing system, system 600, for making a drape having multiple regions with different tackiness is shown. In the example illustrated in FIG. 6, system 600 includes a control system 610, a drape manufacturing system 612, a second adhesive application system 614, and a first adhesive application system 616. Control system 610 is configured to control one or more of systems 612-616, as further described herein.

Drape manufacturing system 612 may be configured to receive drape material and to manufacture a drape from the drape material. For example, drape manufacturing system may include a measuring system, a cutting system, one or more other systems, or a combination thereof, configured to measure and cut the drape material to from a drape, such as drape 100, 200, 300, or 530, as non-limiting examples. The drape may include a first region and at least a second region.

Second adhesive application system 614 may be configured to receive the drape and to dispose second adhesive to at least the second region of the drape. For example, second adhesive application system 614 may be configured to dispose encapsulated second adhesive (e.g., encapsulated within one or more shells) to the second region of the drape. In some implementations, the encapsulated second adhesive may include acrylic adhesive encapsulated in one or more shells that are responsive to an energy input, such as visible light, ultraviolet light, infrared light, ultrasound, pressure, or heat. In some other implementations, second adhesive application system 614 may be configured to coat the second region with a light switchable adhesive having at least two phases. In some implementations, second adhesive application system 614 may include an applicator, such as a die (e.g., a slot die), a roller, a patterned roller, a spray nozzle, etc., to apply the second adhesive. Additionally, or alternatively, second adhesive application system 614 may include an encapsulation system configured to encapsulate the second adhesive in one or more shells.

First adhesive application system 616 may be configured to receive the drape with the second adhesive disposed on at least the second region and to apply a first adhesive to the first region. In some implementations, first adhesive application system 616 may also be configured to apply the first adhesive to the second region and the second adhesive. For example, in implementations in which encapsulated acrylic adhesive is disposed on the second region, first adhesive application system 616 may be configured to apply silicone gel adhesive to the first region and to the second region, such that the encapsulated acrylic adhesive is within the silicone gel adhesive. The first adhesive may have a lower tackiness than the second adhesive. In some other implementations, first adhesive application system 616 is configured to apply the first adhesive to only the first region. For example, in implementations in which a light switchable adhesive is applied to the second region by second adhesive application system 614, the first adhesive is only applied to the first region (or at least is not applied to the second region). In some implementations, first adhesive application system 616 may include an applicators, such as a die (e.g., a slot die), a roller, a patterned roller, a spray nozzle, etc., to apply the first adhesive.

Although illustrated as separate systems, systems 612-616 may be incorporated into a single system. For example, drape manufacturing system 612, second adhesive application system 614, and/or first adhesive application system 616 may be incorporated into a single system. Additionally, system 600 may include one or more other systems, such as a protective film/cover generation system (e.g., a cover film lamination system), a post-processing system, a packing system, a sterilization system, or a combination thereof.

Control system 610 includes one or more interfaces 630, one or more controllers, such as representative controller 632, and one or more input/output (I/O) devices 638. Interfaces 630 may include a network interface and/or a device interface configured to be communicatively coupled to one or more other devices, such as drape manufacturing system 612, second adhesive application system 614, or first adhesive application system 616. For example, interfaces 630 may include a transmitter, a receiver, or a combination thereof (e.g., a transceiver), and may enable wired communication, wireless communication, or a combination thereof. Although control system 610 is described as a single electronic device, in other implementations, system 600 includes multiple electronic devices. In such implementations, such as a distributed control system, the multiple electronic devices each control a sub-system of system 600, such as drape manufacturing system 612, second adhesive application system 614, or first adhesive application system 616.

The one or more controllers (e.g., controller 632) includes one or more processors and one or more memories, such as representative processor 634 and memory 636. The one or more controllers may include or correspond to a drape manufacturing controller, a second adhesive application controller, a first adhesive application controller, or a combination thereof. Drape manufacturing controller may be configured to control (or regulate) manufacture of the drape, such as controlling positioning of the drape material, measuring of the drape material, and/or cutting of the drape material. For example, processor 634 may be configured to generate and/or communicate first control signals 650, such as position control signals, measuring control signals, cutting control signals, or a combination thereof, to drape manufacturing system 612.

Second adhesive application controller may be configured to control (or regulate) application of the second adhesive to the drape, such as controlling positioning of the applicator, application of the second adhesive, etc. For example, processor 634 may be configured to generate and/or communicate second control signals 652, such as position control signals, application control signals, or a combination thereof, to second adhesive application system 614. First adhesive application controller may be configured to control (or regulated) application of the first adhesive to the drape, such as controlling positioning of the applicator, application of the first adhesive, etc. For example, processor 634 may be configured to generate and/or communicate third control signals 654, such as position control signals, application control signals, or a combination thereof, to first adhesive application system 616.

Memory 636, such as a non-transitory computer-readable storage medium or device, may include volatile memory devices (e.g., random access memory (RAM) devices), nonvolatile memory devices (e.g., read-only memory (ROM) devices, programmable read-only memory, and flash memory), or both. Memory 636 may be configured to store instructions 640, one or more thresholds 642, and one or more data sets 644. Instructions 640 (e.g., control logic) may be configured to, when executed by processor 634, cause processor 634 to perform the operations described herein. One or more thresholds 642 and one or more data sets 644 may be configured to cause processor 634 to generate control signals. For example, processor 634 may generate and communicate control signals in response to receiving data from systems 612-616 and comparing at least a portion of the data to one or more thresholds 642.

In some implementations, processor 634 may include or correspond to a microcontroller/microprocessor, a central processing unit (CPU), a field-programmable gate array (FPGA) device, an application-specific integrated circuit (ASIC), another hardware device, a firmware device, or any combination thereof. Processor 634 may be configured to executed instructions 640 to perform one or more operations described with reference to FIG. 6 and/or one or more operations of the method of FIG. 9.

One or more I/O devices 638 may include a mouse, a keyboard, a display device, a camera, a microphone or voice command capture device, other I/O devices, or a combination thereof. In some implementations, processor 634 generates and sends control signals responsive to receiving one or more user inputs via one or more I/O devices 638.

Control system 610 may include or correspond to an electronic device such as a communications device, a mobile phone, a cellular phone, a satellite phone, a computer, a tablet, a portable computer, a display device, a media player, or a desktop computer. Additionally, or alternatively, control system 610 may include a personal digital assistant (PDA), a monitor, a computer monitor, a television, any other device that includes a processor or that stores or retrieves data or computer instructions, or a combination thereof.

During operation of system 600, drape manufacturing system 612 forms a drape from drape material. For example, drape manufacturing system 612 may measure the drape material and cut the drape material into a particular shape with particular measurements to form the drape. Second adhesive application system 614 applies the second adhesive to at least the second region of the drape. In some implementations, second adhesive application system 614 applies encapsulated acrylic adhesive to the second region. In other implementations, the second adhesive includes rosin, tackifier chemical compounds, L-3, 4-dihydroxyphenylalanine, L-3, 4-dihydroxyphenylalanine quinone, dehydrodihydroxyphenylalanine, or phosphorylated serine, as non-limiting examples. In some other implementations, second adhesive application system 614 applies a light switchable adhesive to the second region. First adhesive application system 616 applies the first adhesive to the first region of the drape. In some implementations, first adhesive application system 616 also applies the first adhesive to the second region (such as when the second region includes encapsulated second adhesive). The operations performed by drape manufacturing system 612, second adhesive application system 614, and first adhesive application system 616 may be performed based on control signals from control system 610, such as first control signals 650, second control signals 652, and third control signals 654.

Thus, system 600 of FIG. 6 produces a drape having multiple regions with different tackiness. The drape may be used, such as with a wound therapy device, as further described with reference to FIG. 5A.

Figures 7, 8:
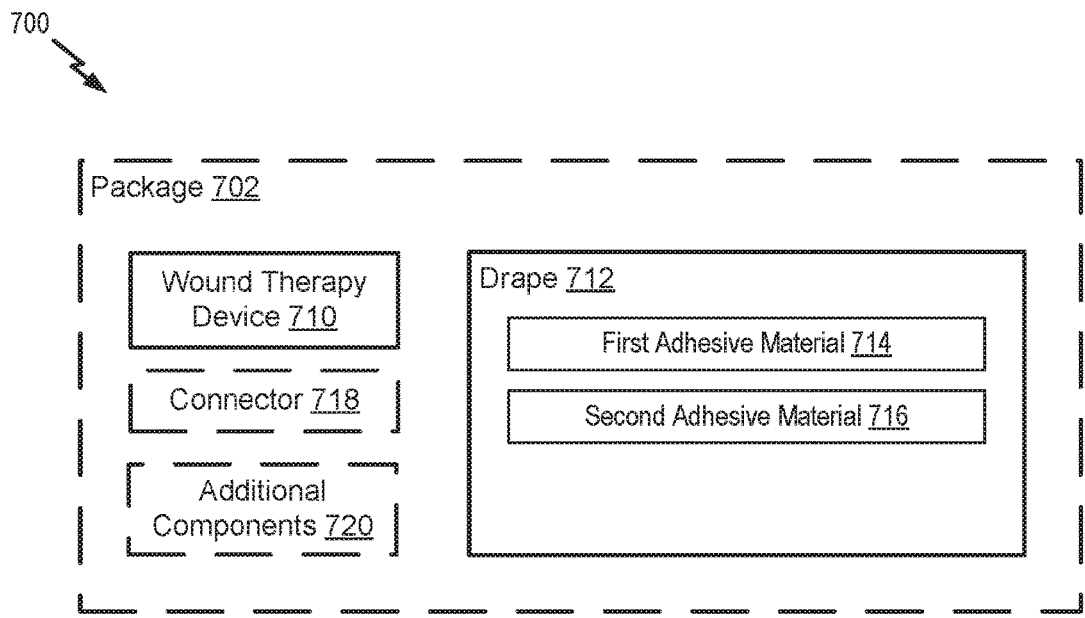
FIG. 7 is a block diagram of an example of a kit for wound therapy.
FIG. 8 is a flowchart illustrating an example of a method of using a drape.

Referring to FIG. 7, a kit 700 for wound therapy is illustrated. Kit 700 includes a wound therapy device 710, a drape 712, or both. Wound therapy device 710 may include or correspond to therapy device 510, and drape 712 may include or correspond to drape 100, 200, 300, or 530.

In some implementations, drape 712 includes a first adhesive material 714 and a second adhesive material 716. For example, a first region of drape 712 may include first adhesive material 714, and a second region of drape 712 may include second adhesive material 716. First adhesive material 714 may have a first tackiness. Second adhesive material 716 may have a second tackiness when in a first phase and a third tackiness when in a second phase. First adhesive material 714 may be configured to maintain the first tackiness when second adhesive material 716 is in the second phase. In some implementations, the first tackiness is the same as the second tackiness.

In some implementations, kit 700 further includes a connector 718, one or more additional components 720, or a combination thereof. Connector 718 may be configured to couple wound therapy device 710 to drape 712. One or more other components 720 may include or correspond to gloves, antiseptic, medical adhesive, dressings, and/or other components.

In some implementations, kit 700 may include a package 702. For example, package 702 may include a box, a bag, a container, or the like. Package 702 may include wound therapy device 710 and/or drape 712. In some implementations, package 702 may further include connector 718 and/or one or more additional components 720. Additionally, or alternatively, package 702 may include a packaging medium (e.g., packaging material), such as foam, paper, or the like. Thus, FIG. 7 describes kit 700 for wound therapy that uses a drape having multiple adhesive materials in multiple regions with different adhesive properties (e.g., tackiness).

FIG. 8 illustrates a method 800 of using a drape. Method 800 may be performed by a patient or care provider using drape 100, 200, or 300 and/or one or more components of system 500. Method 800 includes attaching a drape to a tissue site, at 810. The drape includes a first region including a first adhesive material and a second region including a second adhesive material. The first adhesive material has a first tackiness and the second adhesive material has a second tackiness in a first phase and a third tackiness in a second phase. The third tackiness is greater than the second tackiness. For example, first adhesive material corresponding to first region 103 has a first tackiness, and second adhesive material corresponding to second region 104 has a second tackiness when in a first phase and a third tackiness when in a second phase.

Method 800 further includes applying an energy input to the second region to transition the second adhesive material from the first phase to the second phase, at 812. For example, an energy source (such as energy source 512) may apply an energy input to second region 104 to transition the second adhesive material from the first phase to the second phase.

In some implementations, the energy input is selected from the group consisting of: visible light, infrared light, ultraviolet light, ultrasound, pressure, and heat. Additionally, or alternatively, method 800 may include, prior to applying the energy input, repositioning the drape with respect to the tissue site. For example, before the second adhesive material is transitioned to the second phase, the drape may be repositionable without causing trauma to the wearer. Additionally, or alternatively, method 800 may include removing the drape from the tissue site. For example, because only a portion of the drape is attached with the higher level of tackiness (e.g., the third tackiness), the drape may be removed from the tissue site without causing trauma to the wearer. Additionally, or alternatively, method 800 may include, prior to applying the energy input, removing a protective covering from the second region. For example, a protective covering, such as a UV covering, may be disposed on the second region, and the protective covering may be removed before applying the energy input (e.g., applying ultraviolet light).

Thus, method 800 describes using a drape to attach to a tissue site. The drape may be repositionable prior to transitioning the second adhesive material into the second phase, enabling a wearer to adjust the drape without causing trauma to the skin of the wearer. Additionally, because only a portion (e.g., the second region) of the drape is attached with a higher tackiness, the drape may be removed without causing trauma to the skin of the wearer.

Figure 9:
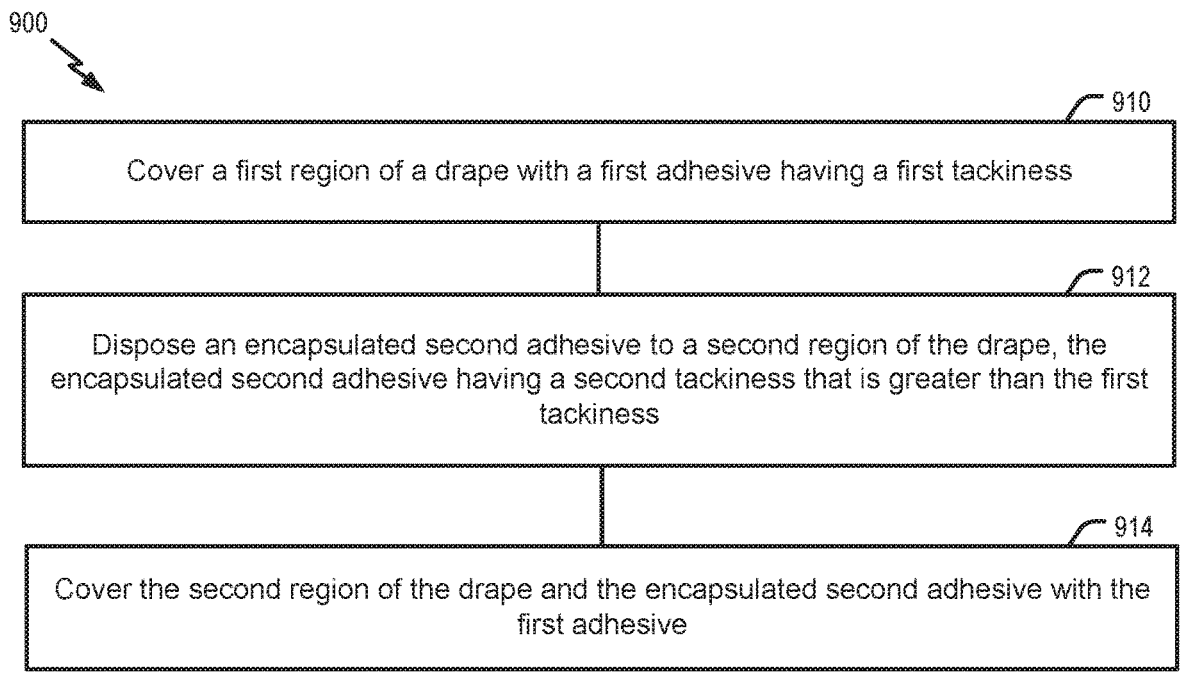
FIG. 9 is a flowchart illustrating an example of a method of forming a drape.

FIG. 9 illustrates a method 900 of manufacturing a drape. Method 900 may be performed at or by system 600, or components thereof. Method 900 includes covering a first region of a drape with a first adhesive having a first tackiness, at 910. For example, first adhesive application system 616 may apply a first adhesive to a first region of a drape.

Method 900 includes disposing an encapsulated second adhesive to a second region of the drape, at 912. The encapsulated second adhesive has a second tackiness that is greater than the first tackiness. For example, second adhesive application system 614 may apply an encapsulated second adhesive (e.g., an acrylic adhesive, as a non-limiting example) to a second region of the drape.

Method 900 further includes covering the second region of the drape and the encapsulated second adhesive with the first adhesive, at 914. For example, first adhesive application system 616 may apply the first adhesive to the second region, covering the encapsulated second adhesive with the first adhesive.

In some implementations, method 900 further includes encapsulating the encapsulated second adhesive in one or more shells. For example, an adhesive, such as an acrylic adhesive, may be encapsulated in one or more shells that are disposed along the second region. Additionally, or alternatively, the first adhesive includes silicone gel adhesive, and the encapsulated second adhesive includes acrylic adhesive. Additionally, or alternatively, method 900 may further include attaching a protective covering to an opposite side of the second region. For example, a protective covering, such as a UV film, may be attached to the opposite side of the second region from the second adhesive material.

Thus, method 900 describes a method of manufacturing a drape that is repositionable and does not cause trauma to the skin of a wearer when removed. For example, only a portion (e.g., the second region) of the drape has a high tackiness, thus, the drape may be removed without causing trauma to the skin of the wearer.

Figure 10:
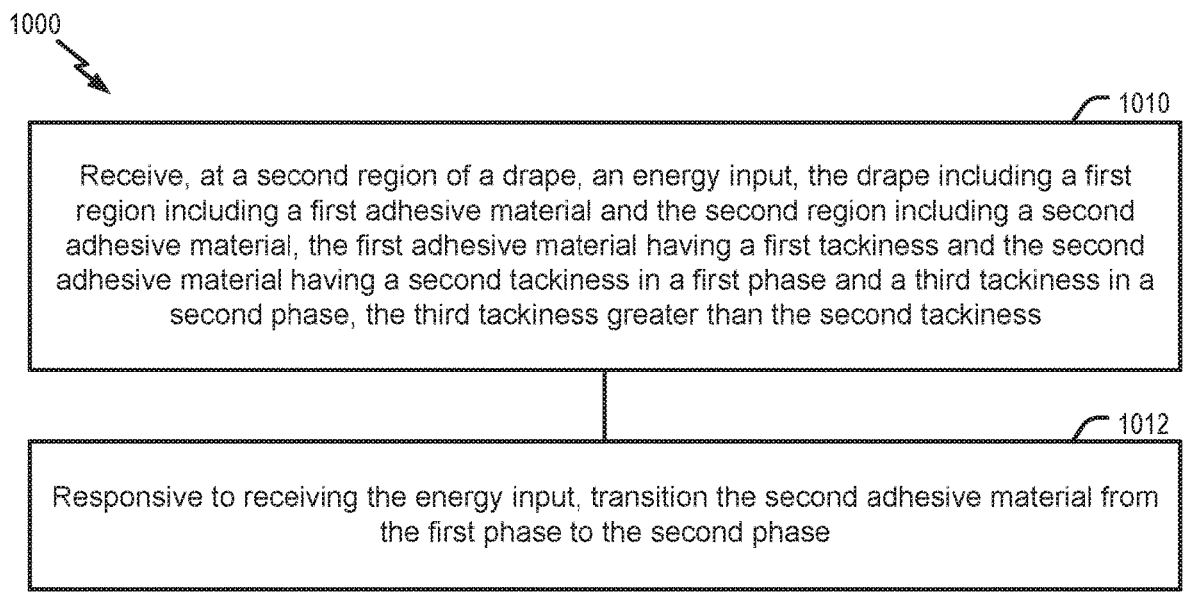
FIG. 10 is a flowchart illustrating an example of another method of using a drape.

FIG. 10 illustrates a method 1000 of using a drape. Method 1000 may be performed at or by drape 100, 200, 300, or 530. Method 1000 includes receiving, at a second region of a drape, an energy input, at 1010. The drape includes a first region including a first adhesive material and the second region including a second adhesive material. The first adhesive material has a first tackiness and the second adhesive material has a second tackiness in a first phase and a third tackiness in a second phase. The third tackiness is greater than the second tackiness. For example, an energy input may be received at second region 104 from an energy source (e.g., energy source 512).

Method 1000 further includes, responsive to receiving the energy input, transitioning the second adhesive material from the first phase to the second phase, at 1012. For example, responsive to receiving the energy input, the second adhesive material (corresponding to second region 104) may transition from the first phase to the second phase.

In some implementations, transitioning the second adhesive material from the first phase to the second phase includes breaking down one or more encapsulations containing an additional adhesive. For example, the second adhesive may include one or more encapsulations of an additional adhesive, such as an acrylic adhesive, that may be broken down by application of the energy input. Additionally, or alternatively, method 1000 may further include changing a color of the second region when the second adhesive material is in the second phase. For example, one or more colorimetric indicators may be encapsulated with the additional adhesive and, upon breaking down of the encapsulation, cause the second region to change color.

Thus, method 1000 describes a method of using a drape. The drape may be used to attach to a tissue site. Because the drape is attached with low tackiness when the second adhesive material is in the first phase, the drape may be repositionable. Additionally, because only a portion (e.g., the second region) of the drape is attached with a higher tackiness, the drape may be removable without causing trauma to the skin of a wearer.

One or more of the methods 800-1000 of FIGS. 8-10 may be implemented in a computer-readable storage device storing instructions that, when executed by a processor, cause the processor to perform the operations of the corresponding method.

It is noted that one or more operations described with reference to one of the methods of FIGS. 8-10 may be combined with one or more operations of another of FIGS. 8-10. For example, one or more operations of method 800 may be combined with one or more operations of method 900. Additionally, or alternatively, one or more operations described above with reference to FIGS. 1-7 may be combined with one or more operations of FIGS. 8-10, or a combination of FIGS. 8-10.

The above specification and examples provide a complete description of the structure and use of illustrative examples. Although certain aspects have been described above with a certain degree of particularity, or with reference to one or more individual examples, those skilled in the art could make numerous alterations to aspects of the present disclosure without departing from the scope of the present disclosure. As such, the various illustrative examples of the methods and systems are not intended to be limited to the particular forms disclosed. Rather, they include all modifications and alternatives falling within the scope of the claims, and implementations other than the ones shown may include some or all of the features of the depicted examples. For example, elements may be omitted or combined as a unitary structure, connections may be substituted, or both. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one example or may relate to several examples. Accordingly, no single implementation described herein should be construed as limiting and implementations of the disclosure may be suitably combined without departing from the teachings of the disclosure.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims. The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A drape comprising:
   a first region including a first adhesive material, the first adhesive material having a first tackiness; and
   at least a second region including a second adhesive material, the second adhesive material having a second tackiness in a first phase and a third tackiness in a second phase, the third tackiness greater than the second tackiness, wherein the first adhesive material is configured to maintain the first tackiness when the second adhesive material is in the second phase, and wherein the first tackiness is the same as the second tackiness.

2. The drape of claim 1, wherein the second adhesive material includes at least one component that is not included in the first adhesive material.

3. The drape of claim 1, wherein the first adhesive material comprises a silicone gel adhesive, and wherein the second adhesive material comprises a releasable acrylic adhesive.

4. The drape of claim 3, wherein the releasable acrylic adhesive is encapsulated in one or more shells when the second adhesive material is in the first phase, and wherein the releasable acrylic adhesive is released when the second adhesive material is in the second phase.

5. The drape of claim 1, wherein the first adhesive material comprises silicone gel adhesive, and wherein the second adhesive material comprises releasable rosin.

6. The drape of claim 1, wherein the first adhesive material comprises silicone gel adhesive, and wherein the second adhesive material comprises a releasable tackifier chemical compound.

7. The drape of claim 1, wherein the first adhesive material comprises silicone gel adhesive, and wherein the second region comprises releasable L-3, 4-dihydroxyphenylalanine, releasable L-3, 4-dihydroxyphenylalanine quinone, releasable dehydrodihydroxyphenylalanine, or releasable phosphorylated serine.

8. The drape of claim 1, wherein the second adhesive material comprises a light switchable adhesive having the second tackiness in the first phase and the third tackiness in the second phase, and wherein the light switchable adhesive is configured to transition from the first phase to the second phase based on receiving light.

9. The drape of claim 1, wherein the second region is configured to receive an energy input to transition the second adhesive material from the first phase to the second phase.

10. The drape of claim 9, wherein the energy input comprises visible light, and wherein the second adhesive material is configured to transition from the first phase to the second phase based on receiving the visible light for more than a threshold time period.

11. The drape of claim 9, wherein the energy input comprises infrared light, and wherein the second adhesive material is configured to transition from the first phase to the second phase based on receiving the infrared light for more than a threshold time period.

12. The drape of claim 9, wherein the energy input comprises ultraviolet light, and wherein the second adhesive material is configured to transition from the first phase to the second phase based on receiving the ultraviolet light for more than a threshold time period.

13. The drape of claim 9, wherein the energy input comprises pressure, and wherein the second adhesive material is configured to transition from the first phase to the second phase based on receiving more than a threshold amount of the pressure.

14. The drape of claim 9, wherein the energy input comprises ultrasound, and wherein the second adhesive material is configured to transition from the first phase to the second phase based on receiving the ultrasound for more than a threshold time period.

15. The drape of claim 9, wherein the energy input comprises heat, and wherein the second adhesive material is configured to transition from the first phase to the second phase based on receiving more than a threshold amount of the heat.

16. The drape of claim 1, wherein the second region forms part of a grid pattern, the grid pattern enabling a selectable area corresponding to the third tackiness.

17. The drape of claim 1, wherein the second region is disposed substantially within a center of the drape.

18. The drape of claim 1, wherein the second region is disposed along an edge of the drape.

19. The drape of claim 1, wherein the second adhesive material is configured to release one or more colorimetric indicators that indicate a position of the second region when the second adhesive material is in the second phase.

20. The drape of claim 1, wherein the first region and the second region are repositionable when the second adhesive material is in the first phase.

21. The drape of claim 1, wherein the second region is not repositionable when the second adhesive material is in the second phase.

22. The drape of claim 1, further comprising a removable protective film disposed on the second region.

23. A system comprising:
   the drape of claim 1, the drape configured to be attached to a tissue site;
   a wound therapy device configured to apply pressure to the tissue site; and
   a connector configured to couple the wound therapy device to the drape.

24. The system of claim 23, further comprising one or more of a light source configured to emit light to the second region of the drape to transition the second adhesive material from the first phase to the second phase, an ultrasound emitter configured to emit ultrasound to the second region of the drape to transition the second adhesive material from the first phase to the second phase, and a heat source configured to emit heat to the second region of the drape to transition the second adhesive material from the first phase to the second phase.

25. A method of using a drape, the method comprising:

attaching a drape to a tissue site, the drape comprising a first region including a first adhesive material and a second region including a second adhesive material, the first adhesive material having a first tackiness and the second adhesive material having a second tackiness in a first phase and a third tackiness in a second phase, wherein the first tackiness is the same as the second tackiness, and the third tackiness greater than the second tackiness; and applying an energy input to the second region to transition the second adhesive material from the first phase to the second phase.

26. A method of manufacturing a drape, the method comprising:
covering a first region of a drape with a first adhesive having a first tackiness;
disposing an encapsulated second adhesive to a second region of the drape, the encapsulated second adhesive having a second tackiness that is greater than the first tackiness; and
covering the second region of the drape and the encapsulated second adhesive with the first adhesive.

27. A method of using a drape, the method comprising:
receiving, at a second region of a drape, an energy input, the drape comprising a first region including a first adhesive material and the second region including a second adhesive material, the first adhesive material having a first tackiness and the second adhesive material having a second tackiness in a first phase and a third tackiness in a second phase, wherein the first tackiness is the same as the second tackiness, and the third tackiness greater than the second tackiness;
responsive to receiving the energy input, transitioning the second adhesive material from the first phase to the second phase.

28. A kit for wound therapy, the kit comprising:
a drape comprising:
a first region including a first adhesive material, the first adhesive material having a first tackiness; and
at least a second region including a second adhesive material, the second adhesive material having a second tackiness in a first phase and a third tackiness in a second phase, wherein the first tackiness is the same as the second tackiness, and the third tackiness greater than the second tackiness, and wherein the first adhesive material is configured to maintain the first tackiness when the second adhesive material is in the second phase; and
a wound therapy device configured to be coupled to the drape.

29. A drape comprising:
a first region including a first adhesive material, the first adhesive material having a first tackiness; and
a second region including one or more shells of an encapsulated second adhesive material, wherein the one or more shells are configured to release the second adhesive material responsive to receipt of an energy input at the second region, and wherein the second adhesive material has a second tackiness that is greater than the first tackiness.

* * * * *